(12) United States Patent
Christian et al.

(10) Patent No.: US 10,212,390 B1
(45) Date of Patent: *Feb. 19, 2019

(54) LOW BANDWIDTH VIDEO

(71) Applicant: Amazon Technologies, Inc., Seattle, WA (US)

(72) Inventors: Andrew Dean Christian, Lincoln, MA (US); David Marc Levine, Sharon, MA (US); Blair Harold Beebe, Menlo Park, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/810,708

(22) Filed: Nov. 13, 2017

Related U.S. Application Data

(63) Continuation of application No. 15/188,581, filed on Jun. 21, 2016, now Pat. No. 9,848,167.

(51) Int. Cl.
| | |
|---|---|
| *H04N 7/15* | (2006.01) |
| *H04N 7/14* | (2006.01) |
| *H04N 5/265* | (2006.01) |
| *H04N 5/14* | (2006.01) |
| *H04N 5/262* | (2006.01) |
| *H04N 7/01* | (2006.01) |
| *H04N 5/232* | (2006.01) |

(52) U.S. Cl.
CPC ............ *H04N 7/147* (2013.01); *H04N 5/144* (2013.01); *H04N 5/23245* (2013.01); *H04N 5/265* (2013.01); *H04N 5/2621* (2013.01); *H04N 7/0117* (2013.01); *H04N 7/0127* (2013.01); *H04N 7/142* (2013.01); *H04N 7/15* (2013.01)

(58) Field of Classification Search
CPC ............ H04N 7/15; H04N 7/152; H04N 7/14; H04N 7/142
USPC .............................. 348/14.01–14.16; 709/204
See application file for complete search history.

(56) References Cited

U.S. PATENT DOCUMENTS

| | | | |
|---|---|---|---|
| 8,773,498 B2 * | 7/2014 | Lindbergh | H04N 7/15 348/14.08 |
| 2014/0267575 A1* | 9/2014 | Eisenberg | H04N 7/152 348/14.09 |
| 2014/0368604 A1* | 12/2014 | Lalonde | H04N 7/147 348/14.08 |
| 2016/0007047 A1* | 1/2016 | Hosseini | H04N 7/147 348/14.13 |

* cited by examiner

*Primary Examiner* — Melur Ramakrishnaiah
(74) *Attorney, Agent, or Firm* — Pierce Atwood LLP

(57) ABSTRACT

Devices, systems and methods are disclosed for enabling a standby mode during videoconferencing, the standby mode having reduced bandwidth consumption and configured to indicate whether a person is present while protecting a privacy of the person. For example, a local device may capture low resolution video data at a low sampling rate, downsample the video data and send the downsampled video data to a remote device, which may upsample the downsampled video data and display the upsampled video data on a display. The upsampled video data indicates an environment of the local device while blurring details, enabling a user of the remote device to identify movement or activity while maintaining privacy for anyone near the local device. The local device may identify activity, motion and/or objects of interest in the video data and may apply a special effect emphasizing the activity, motion and/or objects of interest.

20 Claims, 20 Drawing Sheets

FIG. 7B
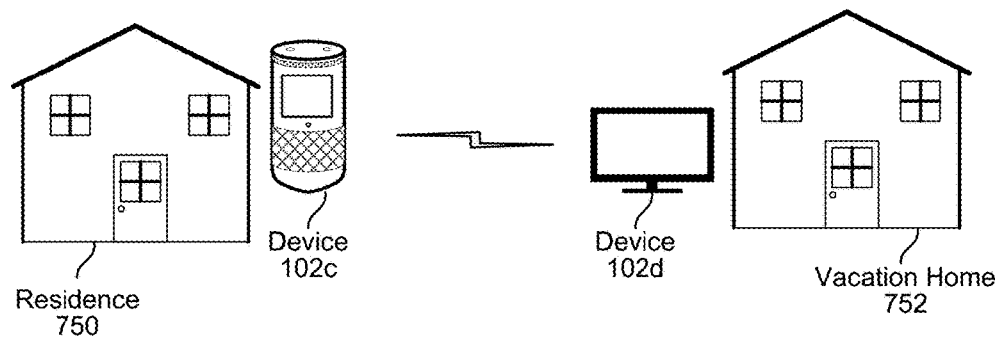
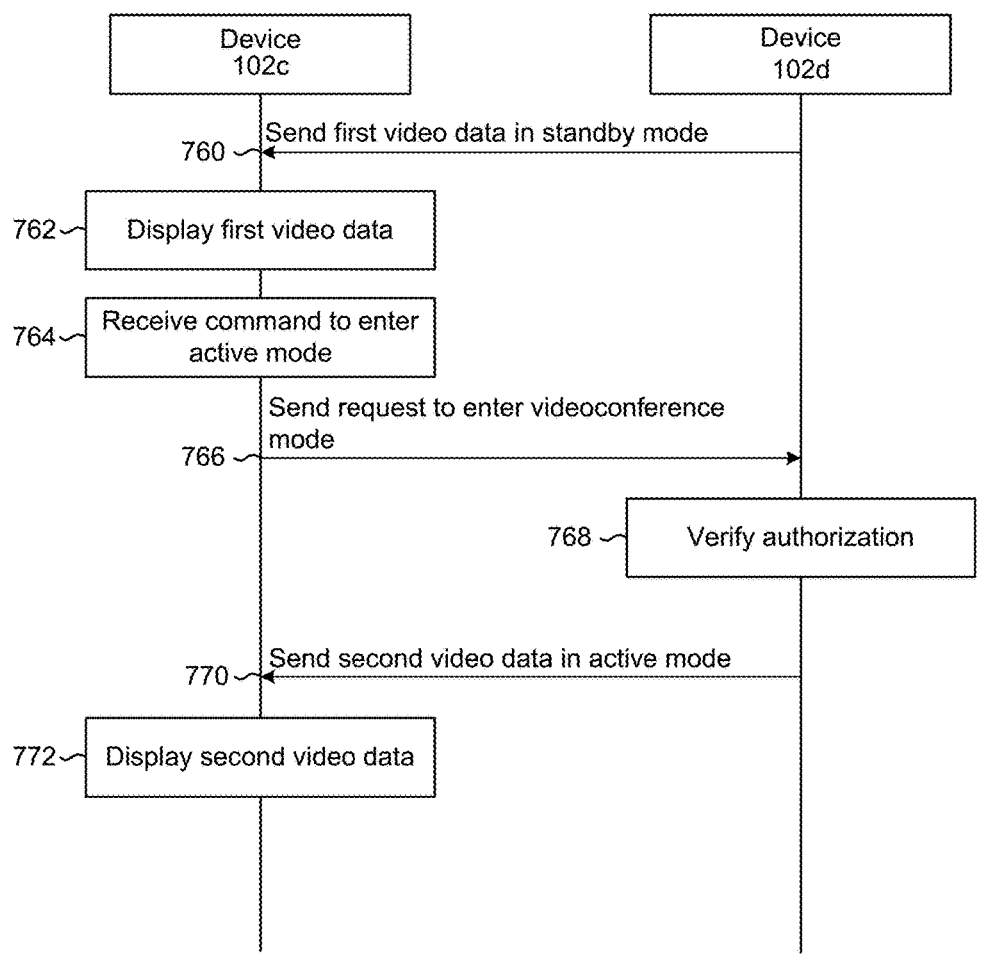

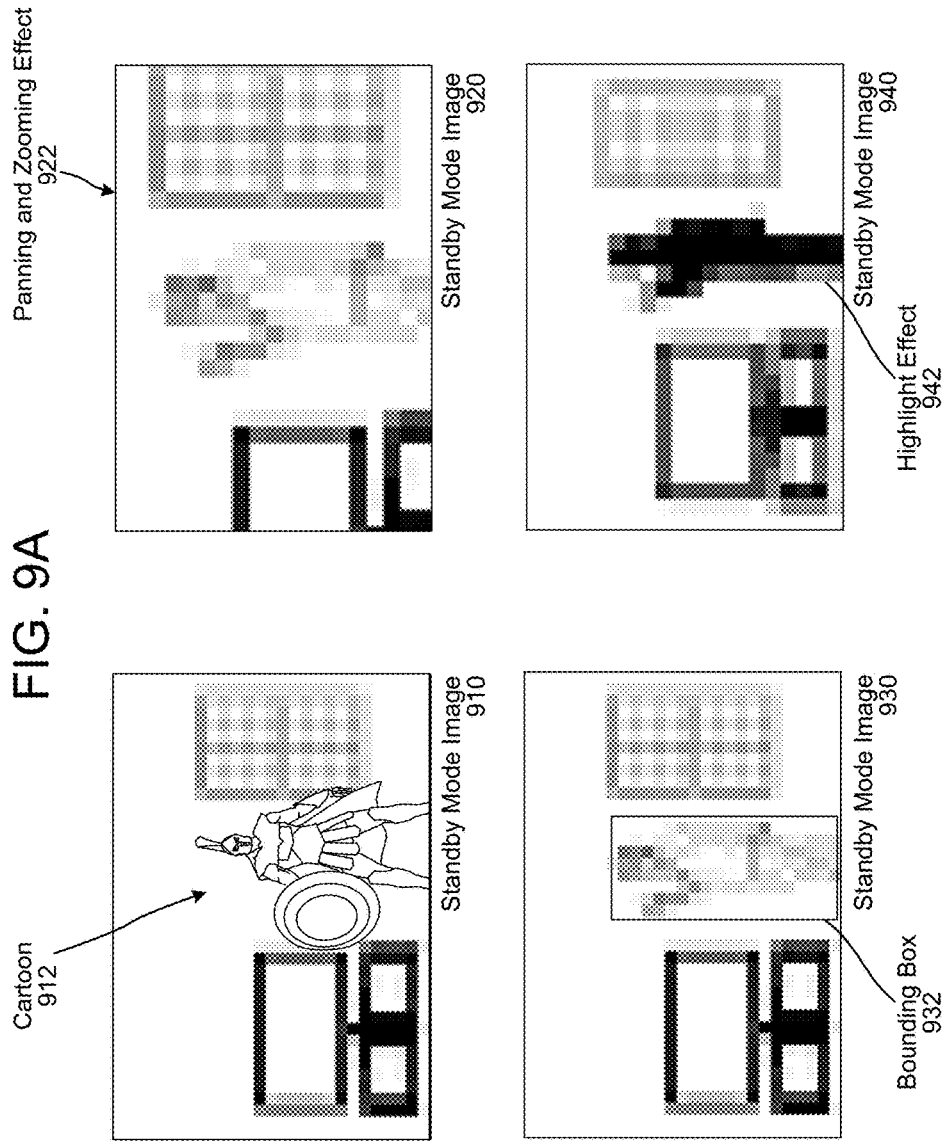

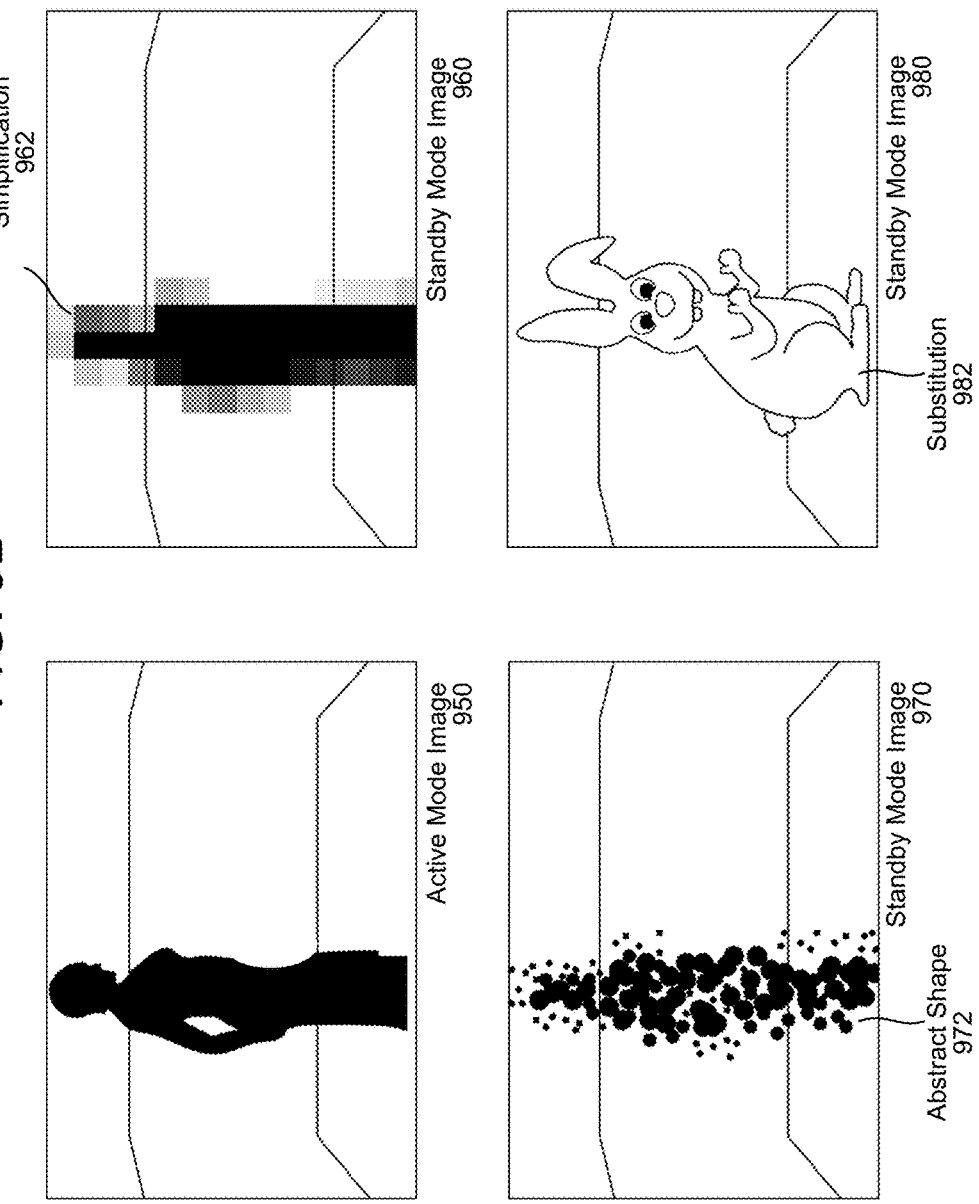

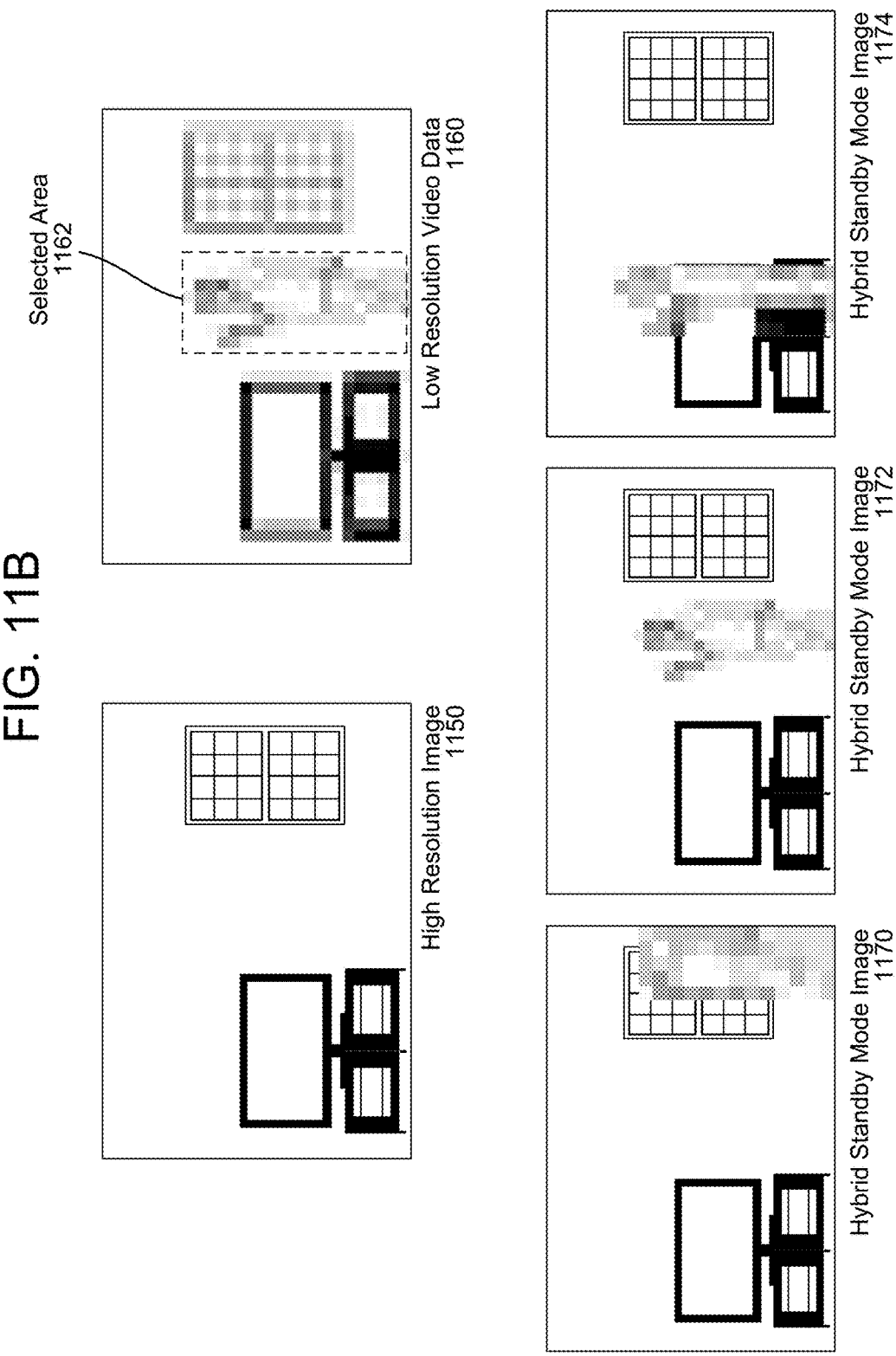

LOW BANDWIDTH VIDEO

CROSS REFERENCE TO RELATED APPLICATION

This application is a continuation of, and claims the benefit of priority of, U.S. Non-provisional patent application Ser. No. 15/188,581, filed Jun. 21, 2016 and entitled "LOW BANDWIDTH VIDEO," in the names of Andrew Dean Christian et al., which is herein incorporated by reference in its entirety.

BACKGROUND

With the advancement of technology, the use and popularity of electronic devices has increased considerably. Electronic devices are commonly used to transmit video data while videoconferencing.

BRIEF DESCRIPTION OF DRAWINGS

For a more complete understanding of the present disclosure, reference is now made to the following description taken in conjunction with the accompanying drawings.

FIGS. 7A-7B are communication diagrams that illustrate exiting a standby mode according to embodiments of the present disclosure.

FIGS. 9A-9B illustrate examples of visual effects used during standby mode according to embodiments of the present disclosure.

FIGS. 11A-11B illustrate examples of a hybrid standby mode according to embodiments of the present disclosure.

DETAILED DESCRIPTION

Figure 1:
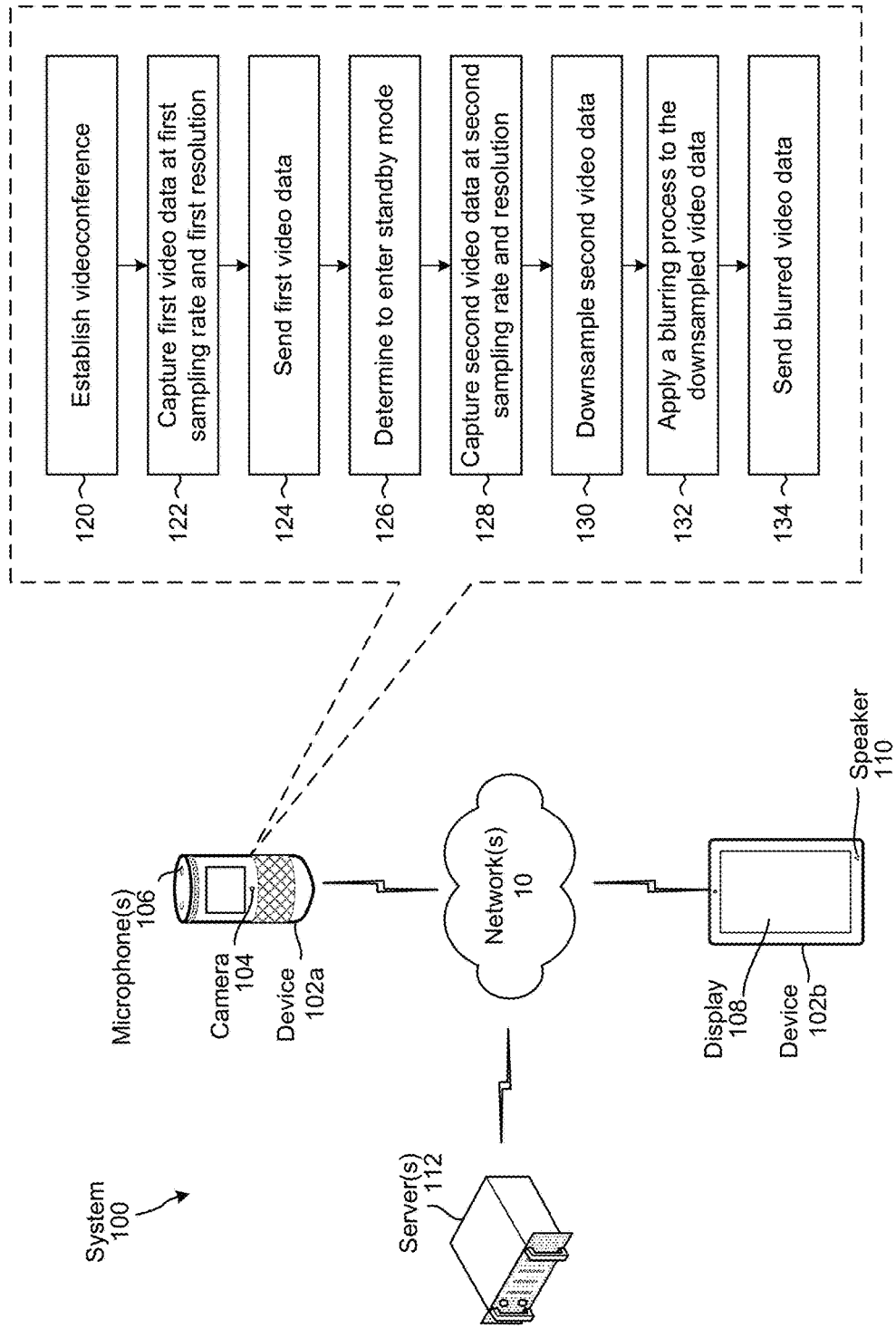
FIG. 1 illustrates a system for videoconferencing between two devices according to embodiments of the present disclosure.

Electronic devices are commonly used to send video data between multiple devices while videoconferencing. For example, a first user of a local device may instruct the local device to capture and send video data to a remote device associated with a second user. Sometimes, a videoconference may continue for an extended period of time and the first user may leave the local device unattended for a duration of time. Other times, the local device may be associated with the remote device such that the second user may establish a videoconference between the remote device and the local device without requiring the first user to authorize the local device to send video data. While it may be desirable for the users to have an ongoing videoconference between the devices (such as between devices belonging to family members), these situations may result in a lack of privacy for the first user, as the second user may be able to view an environment around the local device for an extended period of time and/or when the first user is not present.

To protect a privacy of the first user, some devices may enter an obscured mode and apply a blurring process to blur the video data prior to sending to the remote device. Such a blurring process may give one user a "window" into the environment of another user while continuing to allow for some measure of privacy. For example, after the first user leaves the local device unattended for the duration of time, the local device may enter the obscured mode and send the blurred video data to the remote device, enabling the second user to see the environment around the local device without sharpness or details. This enables the second user to identify if the first user is present in the environment while protecting a privacy of the first user. However, the blurring process consumes processing power of the local device and the blurred video data consumes bandwidth between the local device and the remote device.

To reduce a bandwidth consumption and/or processing consumption while sending blurred video data to the second user, devices, systems and methods are disclosed that provide a standby mode that generates low resolution video data at a local device and sends the low resolution video data to a remote device. The standby mode may have reduced bandwidth consumption (relative to an active mode transmitting full resolution video data) and yet still be configured to indicate whether a person is present while protecting a privacy of the person by obscuring details or identifying information in the environment around the local device. For example, the local device may capture the low resolution video data at a low sampling rate, downsample the video data and send the downsampled video data to the remote device, which may upsample the downsampled video data and display the upsampled video data on a display. The upsampled video data indicates an environment of the local device while blurring details, enabling a user of the remote device to identify movement or activity while maintaining privacy for anyone near the local device. The local device may identify activity, motion and/or objects of interest in the video data and may apply a special effect emphasizing the activity, motion and/or objects of interest.

FIG. 1 illustrates an overview of a system 100 for implementing embodiments of the disclosure. The system 100 includes a first device 102a connected to a second device 102b via network(s) 10. The first device 102a and/or the second device 102b may be connected to server(s) 112 that may provide additional functionality and/or may offload processing from the devices 102a/102b. For example, the server(s) 112 may coordinate generating a communication link between the devices 102*a*/102*b*, may store user profiles associated with the devices 102*a*/102*b*, may perform image signal processing, image/video compression or other processing for the devices 102*a*/102*b*, may apply computer vision (CV) to identify people or objects of interest, or the like.

The first device 102*a* and the second device 102*b* may use the network(s) 10 to videoconference (e.g., send and/or receive image data, video data, and/or audio data). For example, the first device 102*a* may capture image data (e.g., individual images) using a camera 104, may generate video data (e.g., sequence of images) from the image data, capture audio data using microphone(s) 106 and may stream the image data, the video data and/or the audio data to the second device 102*b*. The second device 102*b* may receive the image data, the video data and/or audio data, display image(s) and/or video(s) on a display 108 based on the image data and/or the video data and generate audio from the audio data using speaker(s) 110. Thus, a user of the second device 102*b* may see video of and/or hear audio from a first environment of the first device 102*a* when the first device 102*a* is in an active mode.

In some examples, the videoconference may continue for an extended period of time and/or may be initiated by a second user of the second device 102*b* without requiring acceptance (e.g., acknowledgement) from a first user of the first device 102*a*. In order to protect a privacy of the first user and/or to reduce a bandwidth consumption (relative to the active mode) associated with an extended videoconference, the first device 102*a* may enter a standby mode and may generate video data that partially obscures the first environment. For example, the video data may be blurry (e.g., the device 102 downsamples a series of video frames to reduce a level of detail in the video frames) such that a presence of the first user in the first environment can be determined but an identity of the first user cannot be determined by the second user of the second device 102*b* from the video stream alone. As a first example, if the first user accepts the videoconference (e.g., inputs a command to the first device 102*a* instructing the first device 102*a* to enter the active mode and send unobscured video data) and then leaves the first device 102*a* unattended for a duration of time, the first device 102*a* may enter the standby mode and send obscured video data until the first user inputs a second command to enter the active mode again. As a second example, if the second user initiates the videoconference (e.g., the first device 102*a* receives a request to videoconference from the second device 102*b*) without acknowledgement from the first user (e.g., the first device 102*a* doesn't receive a command from the first user instructing the first device 102*a* to enter the active mode), the first device 102*a* may establish the videoconference in the standby mode and may send obscured video data.

As illustrated in FIG. 1, the device 102 may establish (120) a videoconference, may capture (122) first video data at a first sampling rate and at a first resolution and may send (124) the first video data. For example, the first device 102*a* may receive user input from the first user instructing the first device 102*a* to initiate a videoconference with the second device 102*b* and/or may receive a request to videoconference from the second device 102*b* and receive user input from the first user instructing the first device 102*a* to enter the active mode. In the video conferencing mode, the first device 102*a* may emphasize image quality by operating using the first sampling rate (e.g., 30-60 frames per second) and the first resolution (e.g., 640 pixels by 480 pixels or higher) that may be on a high end of a range of sampling rates and/or resolutions of which the camera 104 is capable of capturing. Thus, the first video data may be configured to allow for a desirable video conference experience. And while the first video data may consume a relatively large amount of bandwidth, it may also be sent to the second device 102*b* using video compression algorithms to at least somewhat reduce the bandwidth.

At some point the device 102 may determine (126) to enter a standby mode and may capture (128) second video data at a second sampling rate and at a second resolution. For example, the first device 102*a* may determine that the first user is not present in the first video data for a duration of time and/or may receive a request to videoconference from the second device 102*b* without receiving acknowledgement from the first user (e.g., an acknowledgement command from the first user instructing the first device 102*a* to accept the call and enter the active mode). In the standby mode, the first device 102*a* may emphasize bandwidth reduction and the second sampling rate (e.g., 10-15 frames per second) and the second resolution (e.g., 320 pixels by 240 pixels or lower) may be on a low end of the range of sampling rates and/or resolutions of which the camera 104 is capable of capturing.

The device 102 may downsample (130) the second video data using a graphics processing unit (GPU) to generate downsampled video data, may optionally apply (132) a blurring process (e.g., apply a Gaussian blur or the like) to the downsampled video data to generate blurred video data and may send (134) the blurred video data. For example, the first device 102*a* may downsample the second video data from the second resolution to a third resolution (e.g., 12 pixels by 12 pixels or the like) using techniques known to one of skill in the art, such as bilinear downsampling, bilinear interpolation, bicubic interpolation, decimation, or the like. The device 102 may optionally apply the blurring process to distort the downsampled video data, although the present disclosure is not limited thereto and the device 102 may send the downsampled video data without applying the blurring process. The device 102 may apply the blurring process using a Gaussian blur or the like and the blurring process may include additional image signal processing techniques, such as adjusting and/or correcting a color, luminance, brightness, contrast, etc. of the downsampled video data.

In the example illustrated in FIG. 1, the second device 102*b* may receive the first video data at a first time and may display the first video data on the display 108 to a second user. The first video data may have a relatively high bandwidth consumption and high image quality and may include details that enable the second user to identify an identity of the first user and/or objects of interest in the first video data. Later, the second device 102*b* may receive the blurred video data at a second time after the first time and may display video(s) based on the blurred video data on the display 108. In contrast to the first video data, the blurred video data may have a relatively low bandwidth consumption and low image quality and may obscure details such that the presence of the first user and/or objects of interest in the first environment can be determined but identities of the first user and/or objects of interest cannot be determined by the second user. Thus, the blurred video data reduces a bandwidth consumption while offering the first user privacy until the first user instructs the first device 102*a* to enter the active mode.

For example, the first device 102*a* may capture image data (e.g., individual images) using a camera 104, may generate video data (e.g., sequence of images) from the image data, capture audio data using microphone(s) 106 and may stream the image data, the video data and/or the audio data to the second device 102b. The second device 102b may receive the image data, the video data and/or audio data, display image(s) and/or video(s) on a display 108 based on the image data and/or the video data and generate audio from the audio data using speaker(s) 110. Thus, a user of the second device 102b may see images/video of and/or hear audio from a first environment of the first device 102a when the first device 102a is in an active mode.

As used herein, "video data" may refer to any visual content, such as video data and/or image data. For example, video data may refer to a series of video frames captured over a period of time, a sequence of images captured at a single time, sequence(s) of images captured periodically, a single image or the like. Thus, the video data includes any visual content captured at any frequency that is sent as part of visual content communication.

FIG. 1 illustrates an example of sending visual content (e.g., video data) from a first device 102a to a second device 102b as part of a videoconference (e.g., real-time communication including visual content). In some examples, a videoconference may refer to bidirectional content (e.g., the first device 102a sends first video data to the second device 102b and the second device 102b sends second video data to the first device 102a), although the disclosure is not limited thereto. Instead, as used herein, a videoconference may refer to any real-time visual content communication that includes visual content (e.g., image data and/or video data) sent from at least a first device to at least a second device. Examples of visual content communication include unidirectional (e.g., content sent from first device 102a to second device 102b but not from second device 102b to first device 102a), such as a security camera or remote capture device; bidirectional unicast (e.g., first content sent from first device 102a to second device 102b and second content sent from second device 102b to first device 102a), such as a video conference, video chat or video messaging between two devices; bidirectional multicast (e.g., first content sent from first device 102a to second device 102b and third device 102c, second content sent from second device 102b to first device 102a and third device 102c, third content sent from third device 102c to first device 102a and second device 102b, etc.), such as a video conference, video chat or video messaging between three or more devices; unidirectional multicast (e.g., first content sent from first device 102a to second device 102b and third device 102c, but the first device 102a does not receive content from the second device 102b or the third device 102c), such as video streaming or the like; any other variation of visual content communication, or any combinations thereof. For example, during a group communication the third device 102c may not send content to the first device 102a and the second device 102b, but may receive content from the first device 102a and the second device 102b.

As used herein, bandwidth defines the amount of information that can be sent and received per unit of time (e.g., MB/second). Thus, the higher the bandwidth, the higher the quality of the picture and sound that can be sent during a video conference, whereas the lower the bandwidth, the lower the quality of the picture and sound that can be sent. Bandwidth consumption refers to the amount of bandwidth actually used (e.g., consumed) in order to send and receive the image data during the video conference. For example, sending high definition video data corresponds to a high bandwidth consumption, whereas sending downsampled video data corresponds to a low bandwidth consumption. As used herein, "reduced bandwidth consumption" indicates that the standby mode consumes less bandwidth relative to the active mode.

Bandwidth consumption may also be referred to as a bitrate of the image data, which is the number of bits that are conveyed or processed per unit of time. For example, the available bandwidth is the maximum amount of data that the first device 102a may send to the second device 102b per unit of time (e.g., an available bandwidth of a communication link between the first device 102a and the second device 102b, measured in MB/second), whereas the bandwidth consumption is the actual amount of data that the first device 102a sends to the second device 102b per unit of time (e.g., video data during a videoconference, measured in MB/second), which cannot exceed the available bandwidth. In order to reduce the bandwidth consumption, the first device 102a may reduce a bitrate of the video data, such as reducing a resolution and/or sampling rate of the video data and/or applying compression algorithms to compress the video data. For example, the first device 102a may encode the video data using a video format H.264, which helps reduce the bandwidth consumption by compressing the video data to a lower bitrate while maintaining an image quality of the video data.

As used herein, an active mode refers to capturing and sending video data at a first resolution, first sampling rate or the like as part of normal operation of the device 102 while sending video data. For example, in the active mode the first device 102a may capture and send first video data using a first sampling rate (e.g., 24 frames per second or higher) and first resolution (e.g., 640 pixels by 480 pixels or higher). In contrast, a standby mode refers to capturing and sending video data at a second resolution, second sampling rate or the like during periods of inactivity to reduce a bandwidth consumption relative to the active mode. For example, the first device 102a may capture and send second video data at a second sampling rate (e.g., 10-15 frames per second or lower) and second resolution (e.g., 320 pixels by 240 pixels or lower) during the standby mode. Additionally or alternatively, the first device 102a may further apply downsampling to the second video data to further reduce the bandwidth consumption relative to the active mode. During both the active mode and the standby mode, the device 102 is capturing and sending video data, in contrast to being powered off or in a low power consumption mode that does not capture and send video data.

In some examples, the device 102 may require acknowledgment to enter the active mode. For example, the first device 102a may receive a request to videoconference from the second device 102b and, prior to entering the active mode, the first device 102a may require an acknowledgement command from a first user of the first device 102a that instructs the first device 102a to accept the videoconference request and enter the active mode. The acknowledgement may be explicit (e.g., user presses a button, issues a voice command or the like), implicit (e.g., user looks at the camera, two or more users are represented in the video data, or the like) and/or automatic (e.g., motion is detected, audio is detected or the like) based on user preferences. The acknowledgement may vary based on the user preferences, which may allow implicit and/or automatic authorization only at certain times of the day, or between certain users and/or devices, or the like. In some examples, acknowledgement of the videoconference may be triggered by receipt of user input. The user input may include, for example, voice input (e.g., speech corresponding to voice commands), physical input (e.g., button press, keyboard, mouse, touchscreen, etc.) received at the device 102, gestures (e.g., hand motions, facial expressions, etc.), actions (e.g., looking at a camera 104 of the device 102), conditions (e.g., two or more people represented in the video data) or the like. The user input may accept the videoconference request and trigger the device 102 to enter the active mode and send unobscured video data.

As discussed above, the server(s) 112 may provide additional functionality to the devices 102a/102b and/or may offload processing from the devices 102a/102b. As a first example, the server(s) 112 may coordinate generating a communication link between the devices 102a/102b. Thus, the server(s) 112 may receive a command and interpret the command to identify the devices 102a/102b and establish the videoconference. As a second example, the server(s) 112 may store user profiles associated with the devices 102a/102b. Thus, the server(s) 112 may store data corresponding to an account, individual users, devices 102 associated with the individual users, associations between individual users, associations between individual devices 102, address information corresponding to individual devices 102, or the like. As a third example, the server(s) 112 may perform image signal processing, image/video compression or other processing for the devices 102a/102b. Thus, the server(s) 112 may receive image data and/or video data from the devices 102a/102b and may process the image data/video data and send the processed image data/processed video data to the devices 102a/102b (e.g., the source device that sent the image data/video data or a destination device). As a fourth example, the server(s) 112 may apply computer vision (CV) to image data/video data received from the devices 102a/102b in order to identify people or objects of interest. Thus, the devices 102a/102b may send image data/video data to the server(s) 112 and the server(s) 112 may identify whether a human is present, pixels associated with the human, an identity of the human, object(s) of interest, pixels associated with the object(s) of interest, whether motion is present in the video data or the like. As a fifth example, the server(s) 112 may receive audio data and/or video data from the devices 102a/102b and may perform speech processing to interpret commands included in the audio data. Thus, a user of the first device 102a may speak an utterance, the first device 102a may capture audio data corresponding to the utterance and send the audio data to the server(s) 112 and the server(s) 112 may perform automatic speech recognition (ASR) and interpret the utterance to generate a command.

While FIG. 1 illustrates the camera 104 as internal to the first device 102a, the present disclosure is not limited thereto and the camera 104 may be external to the first device 102a without departing from the disclosure. Similarly, while FIG. 1 illustrates the second device 102b having an internal display 108, the present disclosure is not limited thereto and the display 108 may be external to the second device 102b. Additionally or alternatively, while FIG. 1 illustrates the first device 102a and the second device 102b being stationary devices (e.g., devices that are intended to remain stationary, the disclosure is not limited thereto and the first device 102a and/or the second device 102b may be mobile devices (e.g., tablet computer, smartphone, or the like), or any device capable of capturing video data and/or displaying video data. Examples of devices 102 may include mobile devices (e.g., tablet computer, smartphone, electronic reader, or the like), computer devices (e.g., laptop computer, desktop computer or the like), media devices (e.g., television, headless device connected to a television, video game console, or the like), speech controlled devices (e.g., devices whose primary input/output is through audio), although the disclo-sure is not limited thereto. While FIG. 1 illustrates the first device 102a and the second device 102b being different, the disclosure is not limited thereto and the first device 102a may be identical to the second device 102b.

In some examples, the videoconference may include video data and/or audio data sent in only one direction. For example, the second device 102b may not include a camera 104 and/or microphone(s) 106, the first device 102a may not include a display 108 and/or speaker(s) 110, and/or a user of the second device 102b may not want to send video data or audio data to the first device 102a. Examples of unidirectional videoconferencing include a first user of the first device 102a wanting to show something to a second user of the second device 102b (e.g., friends and family sharing audio and/or video), a second user of the second device 102b monitoring a first user of the first device 102a (e.g., a parent supervising a child), and/or a baby camera, security camera or other device enabling a user of the second device 102b to see a remote location (e.g., a single user controlling the first device 102a and the second device 102b).

In some examples, the videoconference may include video data and/or audio data sent in both directions. For example, the second device 102b may include a second camera 104 and/or second microphone(s) 106 and the first device 102a may include a second display 108 and/or second speaker(s) 110. The second device 102b may capture video data using the second camera 104 and/or audio data using the second microphone(s) 106 and may send the video data and/or audio data to the first device 102a. The first device 102a may receive the video data and/or audio data and display the video data on the second display 108 and/or generate audio from the audio data using the second speaker(s) 110. Thus, a user of the first device 102a may see video of and/or hear audio from a second environment of the second device 102b. An example of bidirectional videoconferencing is a first user of the first device 102a communicating with a second user of the second device 102b (e.g., conversation between friends and family), although bidirectional videoconferencing may allow the first user and/or the second user to view video data when the other user is not present (e.g., second user may view video from a first location of the first device 102a when the first user is not present).

While FIG. 1 illustrates only two devices 102a/102b, the disclosure is not limited thereto and the videoconference may include video data and/or audio data sent from multiple devices (e.g., multi-directional videoconferencing) without departing from the disclosure. For example, three or more family members may videoconference together. Prior to a first family member instructing the first device 102a to enter the active mode (e.g., at the beginning of the videoconference prior to the first family member joining), or when the first user leaves the first device 102a unattended for a duration of time, the first device 102a may enter the standby mode while a second family member and a third family member converse.

A videoconference may be similar to a phone call to enable friend and family to keep in touch, or a user may establish a videoconference for a duration of time to monitor the remote location, such as a pet owner checking on their pets while at work or a homeowner checking on their home (e.g., residence, vacation home or the like) while away. When the first device 102a and the second device 102b are associated with a single user, the user may establish a videoconference by sending a request from a local device (e.g., second device 102b) to a remote device (e.g., first device 102a) and the remote device may capture and send video data. When the first device 102a and the second device 102b are associated with different users, a video conference may be established when a first user sends a request to videoconference to the second user and the second user accepts the request (e.g., acknowledgment). After the videoconference is established, the first device 102a and/or the second device 102b may continuously stream video data and/or audio data for the duration of the videoconference.

In some examples, a videoconference may be a continuous event. For example, a videoconference may be established and the first device 102a and/or the second device 102b may continuously stream video data and/or audio data for an extended period of time (e.g., hours, days, etc.), regardless of whether a user is present at either device 102a/102b. Additionally or alternatively, the first device 102a and the second device 102b may be associated such that either device 102a/102b may initiate a videoconference without requiring acknowledgment (e.g., acceptance of the videoconference by a user of the other device 102a/102b). Thus, the videoconference may continue for an extended period of time and/or start and stop without acknowledgement from a user of the devices 102a/102b. Examples may include a videoconferencing room between two locations (e.g., a first conference room in a first office location and a second conference room in a second office location), videoconferencing between close family and friends (e.g., husband/wife, parent/child, siblings and/or close friends may establish an ongoing videoconference between two devices 102), remote monitoring (e.g., pet owner monitoring their pets, homeowner monitoring their home, etc) or the like.

The first device 102a and the second device 102b may be associated directly (e.g., a specific device is explicitly given permission to videoconference with a specific device), based on a user (e.g., a first user is associated with a second user), based on an account (e.g., the first device 102a and the second device 102b are associated with a single account) or the like. For example, close friends and family may provide permission to each other to initiate a videoconference without requiring acknowledgement in order to facilitate communication. While a videoconference may be a continuous event (e.g., continuing for an extended period of time and/or initiated without acknowledgement from a user), the user may not want to send unobscured video data without their knowledge. Therefore, a device may generate video data that partially obscures the environment until the user grants permission (e.g., explicitly, implicitly, automatically or the like) to send unobscured video data. For example, the video data may be blurry (e.g., include a series of video frames that are blurred using image signal processing techniques) such that a presence of the user in the environment can be determined but an identity of the user cannot be determined. As a first example, if the user accepts the videoconference and then leaves for a duration of time, the device may send the obscured video data until the user inputs a command to send the unobscured video data. As a second example, if a second user initiates the videoconference and the user does not grant permission to send the unobscured video data, the device may establish the videoconference but send the obscured video data.

Figure 2:
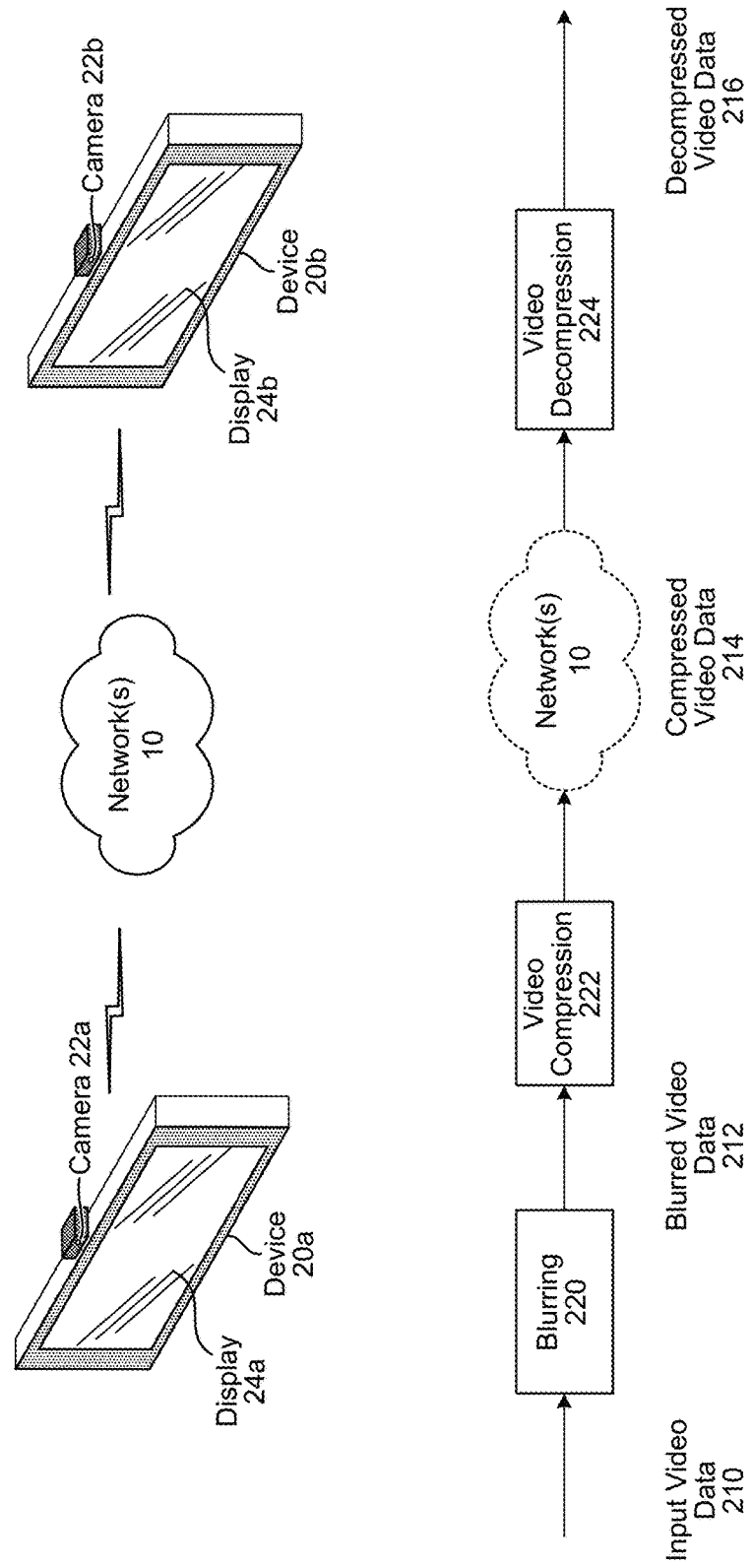
FIG. 2 illustrates an example of obscured video data that consumes a large amount of bandwidth.

FIG. 2 illustrates an example of obscured video data that consumes a large amount of bandwidth. As illustrated in FIG. 2, a first device 20a may be connected to a first camera 22a and a first display 24a and may communicate with a second device 20b, which is connected to a second camera 22b and a second display 24b, via the network(s) 10. While the first device 20a videoconferences with the second device 20b, the first camera 22a may capture input video data 210 using a relatively high sampling rate (e.g., 24 frames per second or higher) and relatively high resolution (e.g., 640 pixels by 480 pixels or higher). When the first device 20a determines to send obscured video data, the first device 20a continues capturing the input video data at the same sampling rate and resolution but blurs the input video data prior to sending to the second device 20b.

For example, the first device 20a may capture the input video data 210 using the first camera 22a, may apply blurring 220 (using a blurring process or algorithm) to the input video data 210 to generate blurred video data 212, may apply video compression 222 to the blurred video data 212 to generate compressed video data 214 and may send the compressed video data 214 to the second device 20b. The second device 20b may receive the compressed video data 214 and may apply video decompression 224 to generate decompressed video data 216 to display on the second display 24b.

As the input video data 210 is captured using the relatively high sampling rate and relatively high resolution, a size of the input video data is relatively large. Therefore, the blurring 220 may be processor intensive for a central processing unit (CPU) of the first device 20a and, despite being compressed, the compressed video data 214 may consume a relatively large amount of bandwidth. Therefore, while the obscured video data protects a privacy of a user of the first device 20a, the obscured video data consumes a relatively large amount of processing power of the first device 20a and bandwidth between the first device 20a and the second device 20b.

Figure 3:
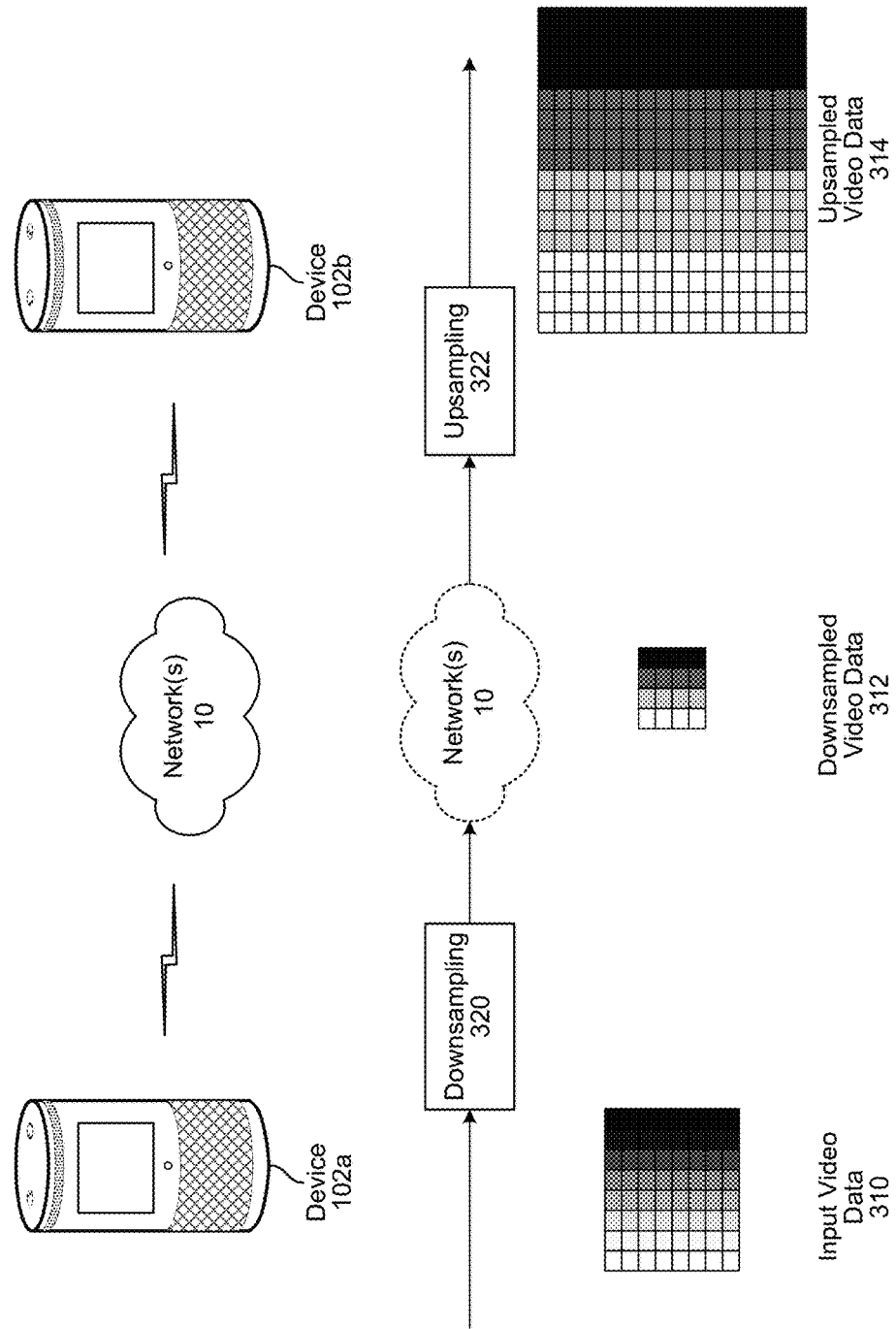
FIG. 3 illustrates an example of a standby mode with reduced bandwidth consumption according to embodiments of the present disclosure.

FIG. 3 illustrates an example of a standby mode with reduced bandwidth consumption according to embodiments of the present disclosure. As illustrated in FIG. 3, a first device 102a may communicate with a second device 102b via the network(s) 10. While the first device 102a videoconferences with the second device 102b in an active mode, the first device 102a may capture first video data using a first sampling rate (e.g., 24 frames per second or higher) and a first resolution (e.g., 640 pixels by 480 pixels or higher). However, when the first device 102a determines to enter a standby mode and send obscured video data, the first device 102a captures input video data 310 at a second sampling rate (e.g., 10-15 frames per second or lower) and a second resolution (e.g., 320 pixels by 240 pixels or lower). The first device 102a may further apply downsampling 320 to the input video data 310 using a first graphics processing unit (GPU) on the first device 102a to generate downsampled video data 312, which may have a third resolution (e.g., 12 pixels by 12 pixels) that is lower than the second resolution. The first device 102a may send the downsampled video data 312 to the second device 102b. The second device 102b may apply upsampling 322 to the downsampled video data 312 using a second GPU on the second device 102b to generate upsampled video data 314. As the downsampled video data 312 has a lower resolution than the upsampled video data 314, a first pixel value corresponding to a pixel(s) (e.g., column 1) of the downsampled video data 312 may correspond to multiple pixels (e.g., columns 1-4) of the upsampled video data 314. Thus, the upsampled video data 314 may have a higher resolution (e.g., more pixels) than the downsampled video data 312 while still displaying roughly the same image.

As the input video data 310 is captured using the second sampling rate and the second resolution, a size of the input video data 310 is relatively small. Further, as the downsampling 320 is performed by the first GPU, it is not processor intensive for a central processing unit (CPU) of the first device 102a. In addition, as the relatively small input video data 310 is further downsampled to generate the downsampled video data 312, the downsampled video data 312 may be sent without applying a video compression algorithm and may consume a relatively small amount of bandwidth. Therefore, the obscured video data protects a privacy of a user of the first device 102a while also consuming a relatively small amount of processing power of the first device 102a and bandwidth between the first device 102a and the second device 102b.

Figure 4:
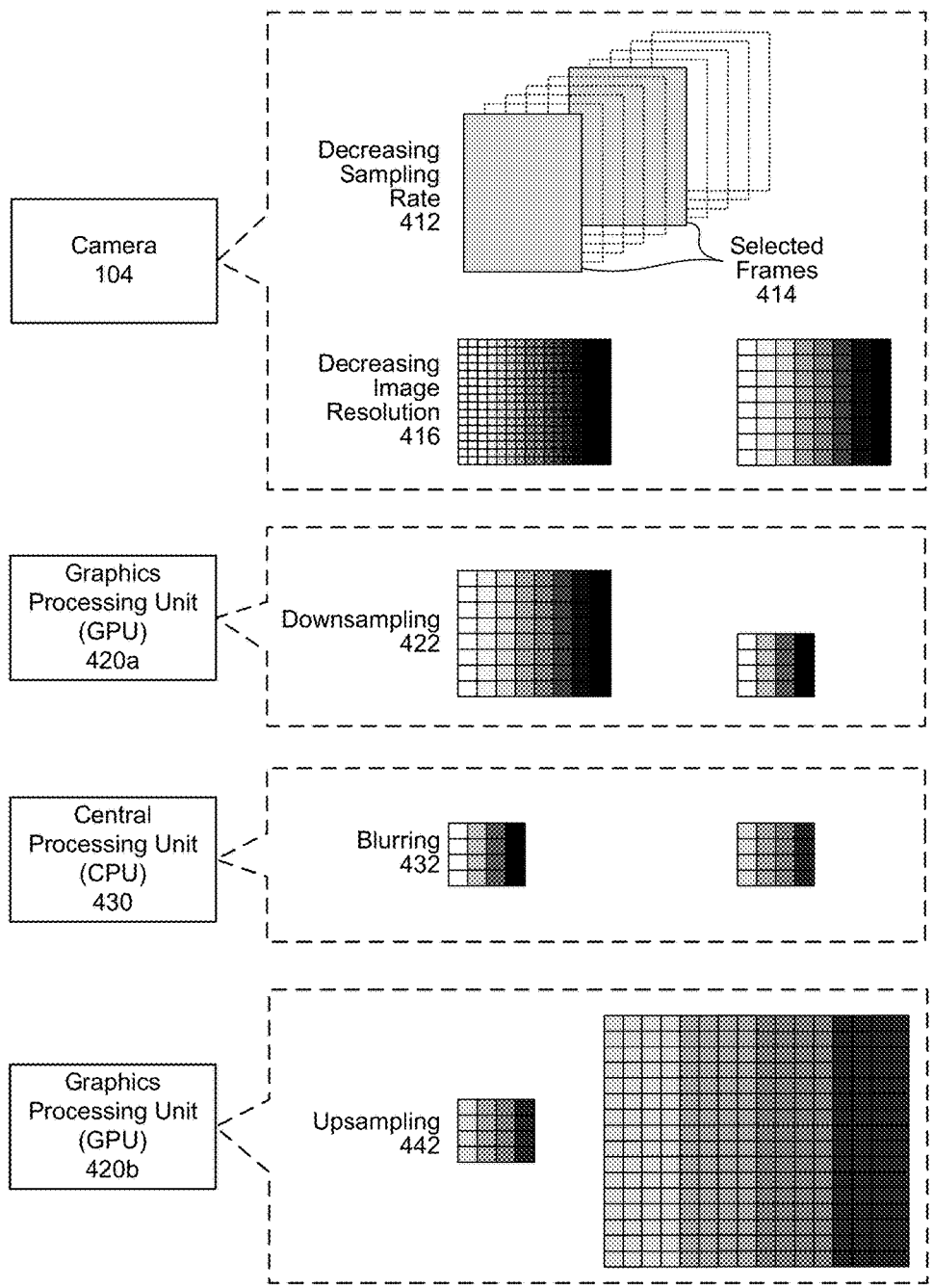
FIG. 4 illustrates examples of techniques to reduce bandwidth consumption according to embodiments of the present disclosure.

FIG. 4 illustrates examples of techniques to reduce bandwidth consumption according to embodiments of the present disclosure. As illustrated in FIG. 4, the camera 104 may reduce bandwidth consumption by decreasing a sampling rate 412 from a first sampling rate (e.g., 24 frames per second or higher) used in an active mode to a second sampling rate (e.g., 10-15 frames per second or lower) used in a standby mode. For example, FIG. 4 illustrates decreasing the sampling rate by five for the standby mode, such that selected frames 414 include every fifth frame of video data that would have been captured in the active mode. In addition, the camera 104 may reduce the bandwidth consumption by decreasing image resolution (416) from a first resolution (e.g., 640 pixels by 480 pixels or higher) to a second resolution (e.g., 320 pixels by 240 pixels or lower).

As illustrated in FIG. 4, a first graphics processing unit (GPU) 420a of the first device 102a may perform downsampling 422 on the input video data 310 having the second resolution to generate the downsampled video data 312 having a third resolution (e.g., 12 pixels by 12 pixels or the like). As a result of the camera 104 decreasing the sampling rate and decreasing the image resolution, and the first GPU 420a performing the step of downsampling 422, a processing consumption of a central processing unit (CPU) 430 of the first device 102a may be reduced relative to generating the blurred video data 212 illustrated in FIG. 2. For example, instead of applying the blurring process 220 to the input video data 210 having the first resolution and the first sampling rate as illustrated in FIG. 2, the CPU 430 may perform an optional blurring process 432 (using a blurring process or algorithm, such as applying a Gaussian blur) to the downsampled video data 312 having the third resolution and the second sampling rate. The blurring 432 process may include distorting the downsampled video data 312 (e.g., applying a Gaussian blur), applying luminance/color correction to the downsampled video data 312 and/or other image signal processing techniques known to one of skill in the art.

Additionally or alternatively, the CPU 430 may perform an optional step of compressing the downsampled video data and/or the blurred video data using a lossy compression algorithm. For example, after performing the blurring process 432, the CPU 430 may compress the blurred video data. Alternatively, instead of performing the blurring process 432, the CPU 430 may compress the downsampled video data. The lossy compression algorithm further reduces a size of the compressed video data relative to the downsampled video data and/or the blurred video data.

A second GPU 420b on the second device 102b may perform upsampling 442 on the downsampled video data 312 (or blurred video data generated by the CPU 430 by applying the blurring process 432 to the downsampled video data 312) to generate the upsampled video data 314 having a fourth resolution, which is larger than the third resolution and may be larger than the first resolution and/or the second resolution. For example, the second GPU 420b may generate the upsampled video data 314 based on a resolution of the display 108 of the second device 102b, which may have a larger resolution than a maximum resolution of the camera 104. The first GPU 420a and/or the second GPU 420b may perform the downsampling 422 and/or upsampling 442 using bilinear upsampling/downsampling, bilinear interpolation, bicubic interpolation, decimation, or the like although the present disclosure is not limited thereto and may include other techniques known to one of skill in the art.

Figure 5A:
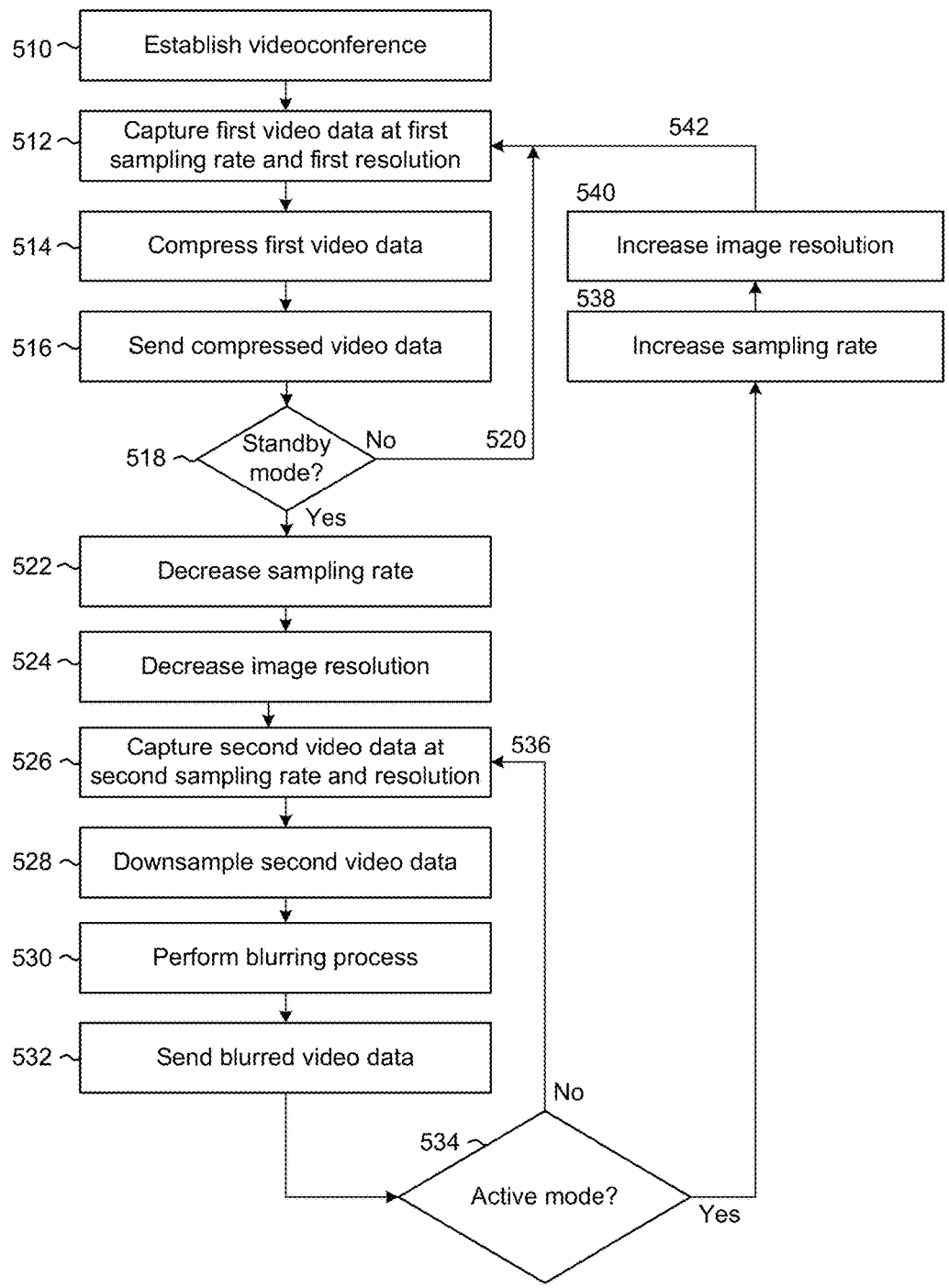
FIGS. 5A-5B are flowcharts conceptually illustrating example methods for videoconferencing according to embodiments of the present disclosure.
Figure 5B:
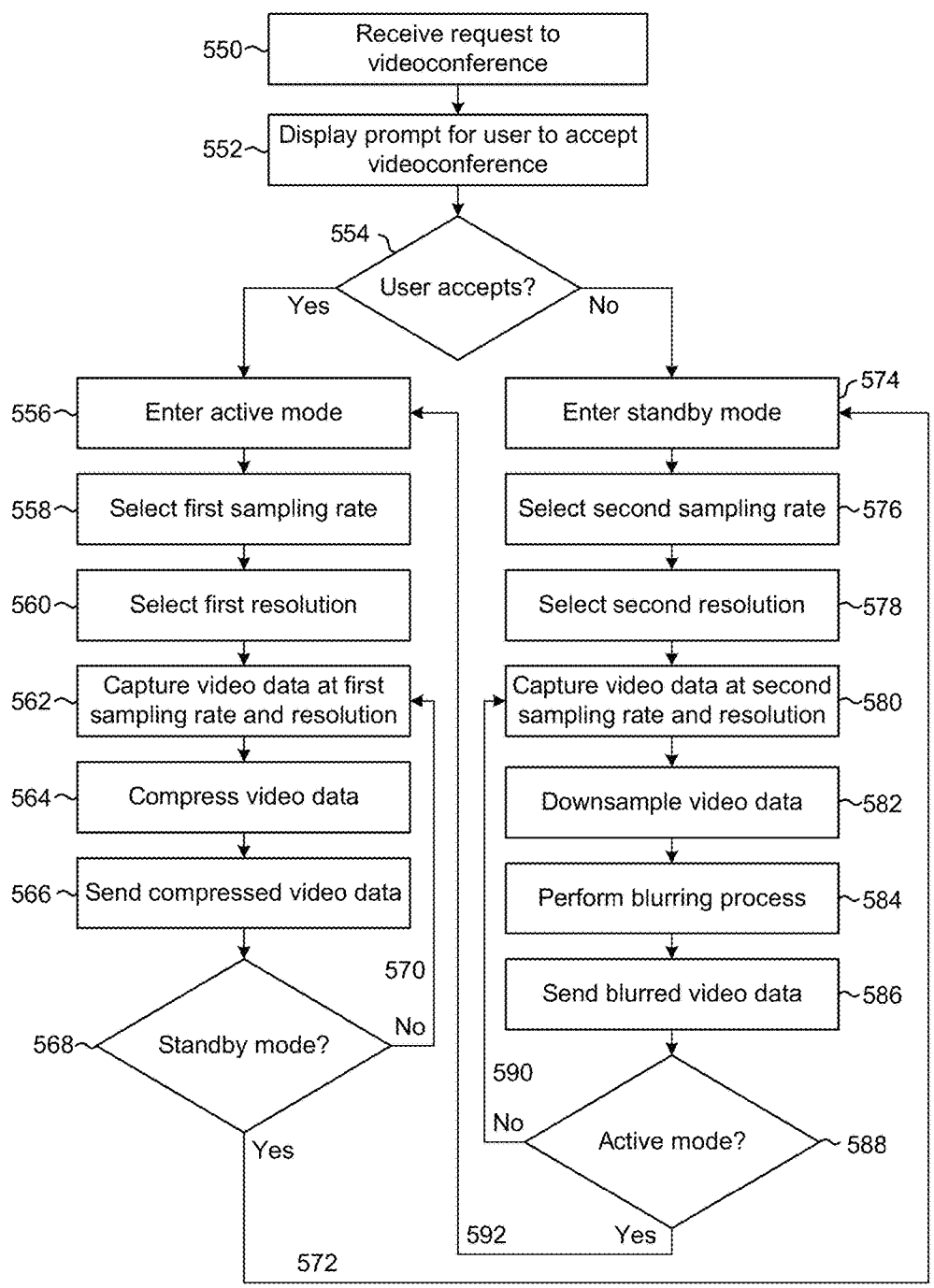

FIGS. 5A-5B are flowcharts conceptually illustrating example methods for sending video data while videoconferencing according to embodiments of the present disclosure. FIG. 5A illustrates an example method when the user establishes a videoconference with a remote device. As illustrated in FIG. 5A, the device 102 may establish (510) a videoconference. For example, a user of the device 102 may instruct the device 102 to send a request to a remote device to establish the videoconference. The device 102 may enter an active mode and capture (512) first video data at a first sampling rate and a first resolution, compress (514) the first video data using a video compression algorithm to generate compressed video data and send (516) the compressed video data to the remote device.

The device 102 may determine (518) whether to enter standby mode. For example, the device 102 may determine to enter standby mode when there is no input to the device 102 for a period of time, no motion and/or faces detected in the video data for a duration of time, and/or based on other parameters that correspond to a human being present. Additionally or alternatively, the device 102 may enter standby mode after a fixed duration of time without departing from the disclosure. If the device 102 does not determine to enter the standby mode, the device 102 may loop (520) to step 512 and continue capturing the first video data in the active mode.

If the device 102 determines to enter the standby mode, the device 102 may decrease (522) a sampling rate from the first sampling rate to a second sampling rate, decrease (524) an image resolution from the first resolution to a second resolution, capture (526) second video data at the second sampling rate and the second resolution, downsample (528) the second video data to generate downsampled video data using a GPU on the device 102, optionally perform (530) a blurring process on the downsampled video data to generate blurred video data and send (532) the blurred video data to the remote device. In some examples, the device 102 may may perform an optional step of compressing the downsampled video data and/or the blurred video data using a lossy compression algorithm. For example, the device 102 may generate compressed video data after the optional blurring process (e.g., compressing the blurred video data) and/or in place of the optional blurring process (e.g., compressing the downsampled video data). The lossy compression algorithm further reduces a size of the compressed video data relative to the downsampled video data and/or the blurred video data.

The device 102 may determine (534) whether to enter the active mode. For example, the device 102 may receive an input from a user of the device 102 instructing the device 102 to enter the active mode. The user input may be a physical input (e.g., keystroke, button press, or the like), a voice input (e.g., a phrase instructing the device 102 to enter the active mode), a remote input (e.g., an instruction from a remote device with required permissions/authorization to command the device 102), or the like. If the device 102 does not determine to enter the active mode, the device 102 may loop (536) to step 526 and continue capturing the second video data in the standby mode.

If the device 102 determines to enter the active mode, the device 102 may increase (538) the sampling rate from the second sampling rate to the first sampling rate, increase (540) the image resolution from the second resolution to the first resolution and may loop (542) to step 512 to capture first video data in the active mode.

FIG. 5B illustrates an example method when a local device receives a request to videoconference from a remote device. In contrast to the example method illustrated in FIG. 5A, the device 102 may establish a videoconference with the remote device prior to receiving input from the user authorizing the device 102 to enter the active mode. As illustrated in FIG. 5B, the device 102 may receive (550) a request to videoconference, display (552) a prompt for a user of the device 102 to accept the videoconference and determine (554) whether the user accepts the videoconference.

If the device 102 determines that the user accepted the videoconference (e.g., input an instruction to the device 102 authorizing the device 102 to enter the active mode), the device 102 may enter (556) the active mode, select (558) a first sampling rate, select (560) a first resolution, capture (562) first video data at the first sampling rate and the first resolution, compress (564) the first video data using a video compression algorithm to generate compressed video data, and send (566) the compressed video data to the remote device.

The device 102 may determine (568) whether to enter standby mode. For example, the device 102 may determine to enter standby mode when there is no input to the device 102 for a period of time, no motion and/or faces detected in the video data for a duration of time, and/or based on other parameters that correspond to a human being present. Additionally or alternatively, the device 102 may enter standby mode after a fixed duration of time without departing from the disclosure. If the device 102 does not determine to enter the standby mode, the device 102 may loop (570) to step 562 and continue capturing the first video data in the active mode.

If the device 102 determines to enter the standby mode, the device 102 may loop (572) to step 574 and enter (574) the standby mode. Additionally or alternatively, the device 102 may enter the standby mode if the device 102 determines that the user did not accept the videoconference in step 554. After entering the standby mode, the device 102 may select (576) a second sampling rate lower than the first sampling rate, select (578) a second resolution lower than the first resolution, capture (580) second video data at the second sampling rate and the second resolution, downsample (582) the second video data to generate downsampled video data using a GPU on the device 102, optionally perform (584) a blurring process on the downsampled video data to generate blurred video data and send (586) the blurred video data to the remote device. In some examples, the device 102 may may perform an optional step of compressing the downsampled video data and/or the blurred video data using a lossy compression algorithm. For example, the device 102 may generate compressed video data after the optional blurring process (e.g., compressing the blurred video data) and/or in place of the optional blurring process (e.g., compressing the downsampled video data). The lossy compression algorithm further reduces a size of the compressed video data relative to the downsampled video data and/or the blurred video data.

The device 102 may determine (588) whether to enter the active mode. For example, the device 102 may receive an input from a user of the device 102 instructing the device 102 to enter the active mode. The user input may be a physical input (e.g., keystroke, button press, or the like), a voice input (e.g., a phrase instructing the device 102 to enter the active mode), a remote input (e.g., an instruction from a remote device with required permissions/authorization to command the device 102), or the like. If the device 102 does not determine to enter the active mode, the device 102 may loop (590) to step 580 and continue capturing the second video data in the standby mode. If the device 102 determines to enter the active mode, the device 102 may loop (592) to step 556 and enter the active mode.

Figure 6A:
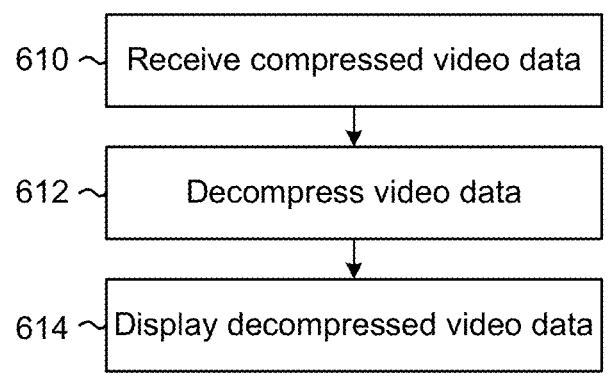
FIGS. 6A-6B are flowcharts conceptually illustrating example methods for receiving video data while videoconferencing according to embodiments of the present disclosure.
Figure 6B:
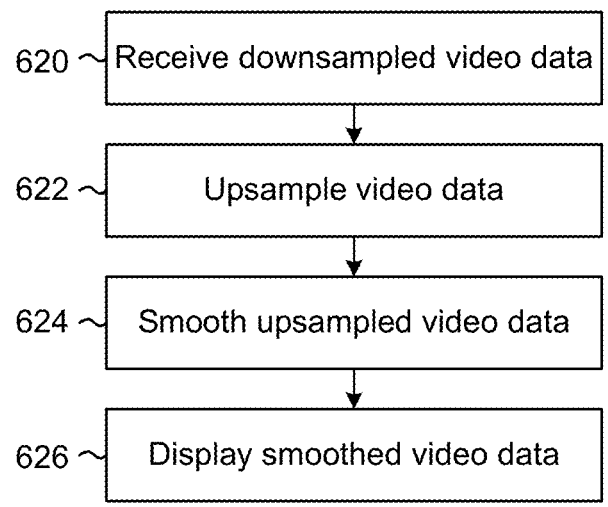

FIGS. 6A-6B are flowcharts conceptually illustrating example methods for receiving video data while videoconferencing according to embodiments of the present disclosure. FIG. 6A illustrates an example method for displaying video data captured in the active mode. As illustrated in FIG. 6A, the device 102 may receive (610) compressed video data, decompress (612) the compressed video data to generate decompressed video data and display (614) the decompressed video data on the display 108. In contrast, FIG. 6B illustrates an example method for displaying video data captured in the standby mode. As illustrated in FIG. 6B, the device 102 may receive (620) downsampled video data, upsample (622) the video data using a GPU on the device 102, optionally smooth (624) the upsampled video data and may display (626) the smoothed video data on the display 108. While not illustrated in FIG. 6B, in some examples the device 102 may receive compressed downsampled video data and may decompress the compressed downsampled video data to generate the downsampled video data.

The device 102 may smooth the upsampled video data in time (e.g., smoothing between pixels in neighboring video frames) and/or in space (e.g., smoothing between neighboring pixels within a video frame). For example, the device 102 may average a first pixel value having a first pixel coordinate in a first video frame and a second pixel value having the first pixel coordinate in a second video frame (e.g., smooth in time) and/or may average the first pixel value having the first pixel coordinate in the first video frame and a third pixel value having a second pixel coordinate in the first video frame (e.g., smooth in space). The device 102 may smooth the upsampled video data using techniques known to one of skill in the art, such as averaging pixel values, performing a blurring process, or the like.

Figure 7A:
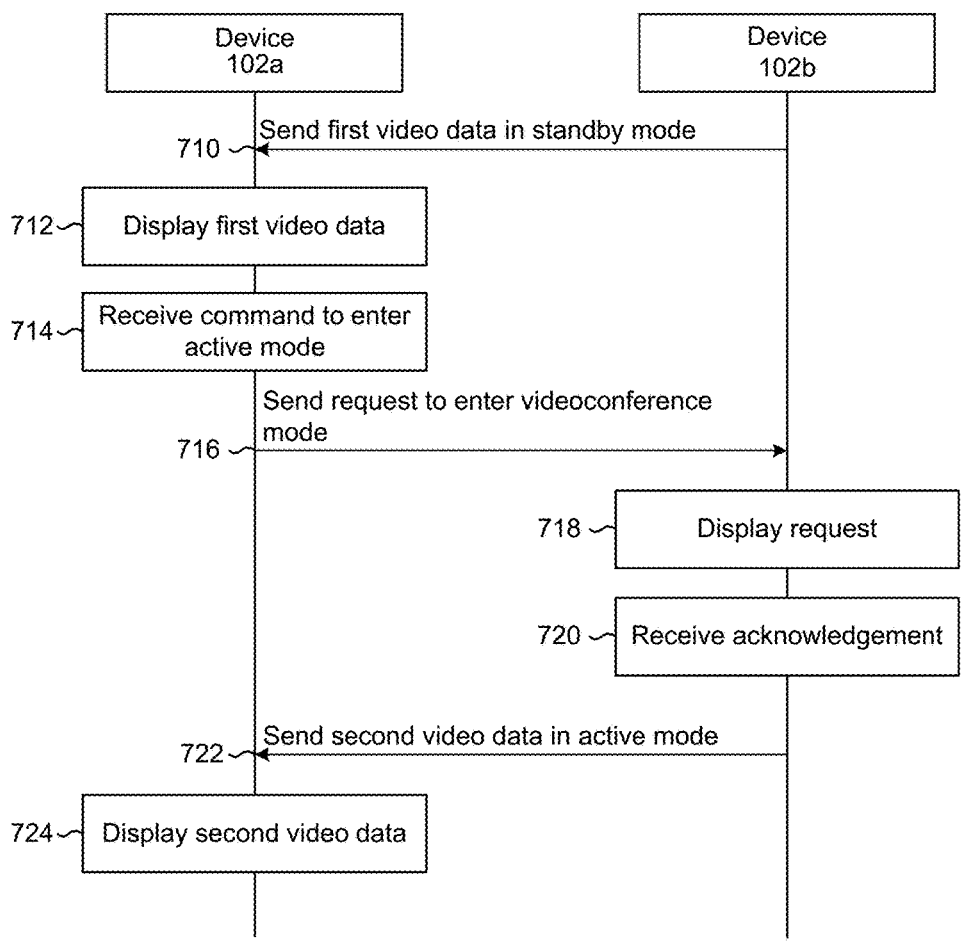

FIGS. 7A-7B are communication diagrams that illustrate exiting a standby mode according to embodiments of the present disclosure. FIG. 7A illustrates a first example including separate users, which requires authorization (e.g., acknowledgement) to exit the standby mode. As discussed above, the authorization may be explicit (e.g., user presses a button, issues a voice command or the like), implicit (e.g., user looks at the camera, two or more users are represented in the video data, or the like) and/or automatic (e.g., motion is detected, audio is detected or the like) based on user preferences. The authorization may vary based on the user preferences, which may allow implicit and/or automatic authorization only at certain times of the day, or between certain users and/or devices, or the like.

As illustrated in FIG. 7A, a first device 102a may be associated with a first user 700 in a first location while a second device 102b may be associated with a second user 702 in a second location. The second device 102b may send (710) first video data to the first device 102a in a standby mode and the first device 102a may display (712) the first video data. The first device 102a may receive (714) a command from the first user 700 instructing the first device 102a to enter an active mode and may send (716) a request to enter the active mode to the second device 102b.

The second device 102b may display (718) the request to the second user 702, receive (720) acknowledgement from the second user 702 instructing the second device 102b to enter the active mode and may send (722) second video data to the first device 102a in the active mode. The first device 102a may display (724) the second video data, which may have a higher sampling rate and/or resolution than the first video data displayed in the standby mode.

In contrast to the first example including separate users, FIG. 7B illustrates a second example including a single user controlling multiple devices, which enables the user to remotely instruct the device to exit the standby mode. As illustrated in FIG. 7B, a third device 102c may be associated with a residence 750, a fourth device 102d may be associated with a vacation home 752, and both the third device 102c and the fourth device 102d may be associated with a single user. The fourth device 102d may send (760) first video data to the third device 102c in a standby mode and the third device 102c may display (762) the first video data. The third device 102c may receive (764) a command from the user instructing the third device 102c to enter an active mode and may send (766) a request to enter the active mode to the fourth device 102d.

The fourth device 102d may verify (768) an authorization associated with the request. In some examples, the request may include an encryption key, a password, authentication data or other security data associated with the user and/or the account, authorizing the user to control the fourth device 102d. For example, the request may include first security data and the fourth device 102d may compare the first security data to second security data previously stored on the fourth device 102d. In some examples, the fourth device 102d may verify the authorization by communicating with the server(s) 112. For example, the fourth device 102d may data included in the request to the server(s) 112 and the server(s) 112 may determine if the data matches security data associated with the user/account.

The fourth device 102d may send (770) second video data to the third device 102c in the active mode and the third device 102c may display (772) the second video data, which may have a higher sampling rate and/or resolution than the first video data displayed in the standby mode.

Figure 8:
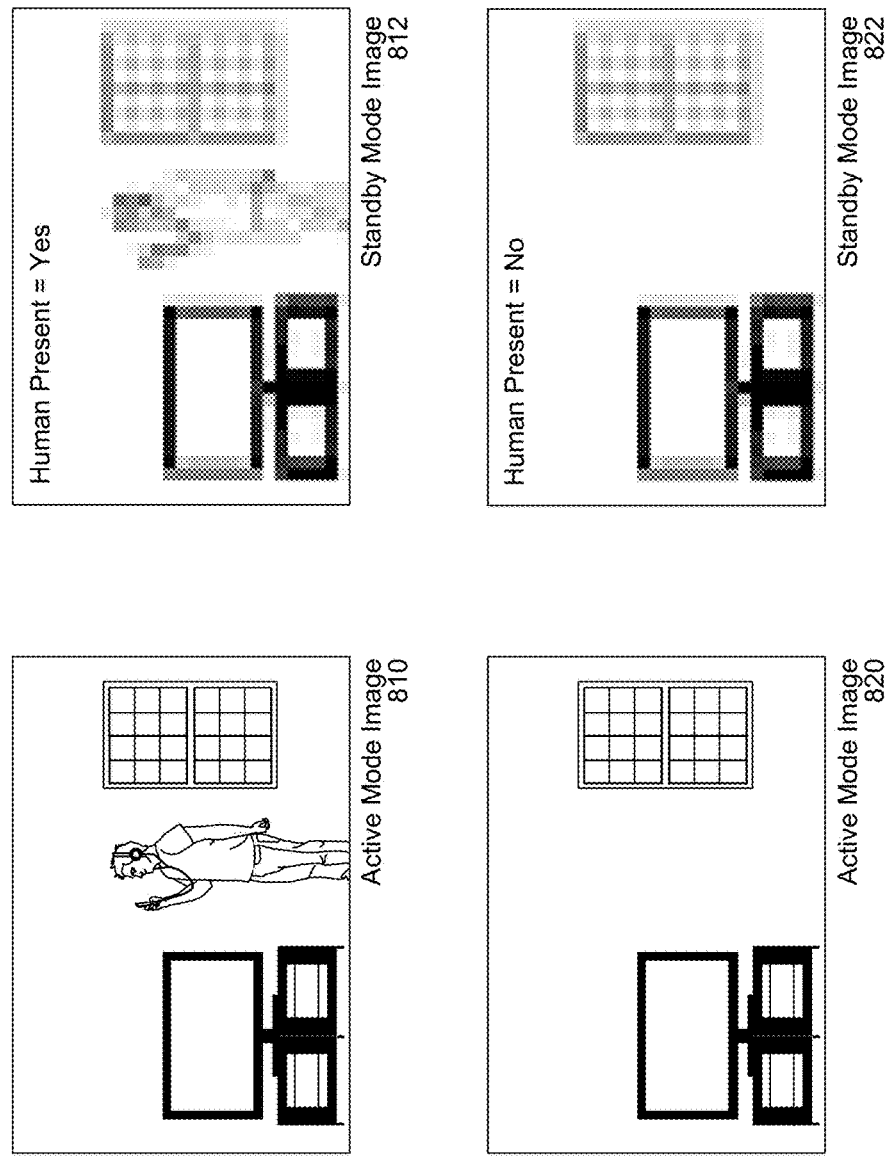
FIG. 8 illustrates examples of images sent during an active mode and corresponding images sent during a standby mode according to embodiments of the present disclosure.

FIG. 8 illustrates examples of images sent during an active and corresponding images sent during a standby mode according to embodiments of the present disclosure. FIG. 8 illustrates a first active mode image 810, a first standby mode image 812 corresponding to the first active mode image 810, a second active mode image 820 and a second standby mode image 822 corresponding to the second active mode image 820. As illustrated in FIG. 8, the first standby mode image 812 and the second standby mode image 822 are blurred relative to the first active mode image 810 and the second active mode image 820, respectively.

In some examples, a first user of a local device viewing obscured video data from a remote device may want to determine if a second user is present at the remote device prior to initiating a videoconference (e.g., sending a request to the remote device requesting that the remote device enter the active mode and send unobscured video data). For example, the first user may check the obscured video data to determine if the second user is present and, if the second user is visible, may initiate the videoconference. While the obscured video data generated in the standby mode protects a privacy of the second user while reducing a bandwidth consumption associated with the videoconference, the first user may be unable to determine if the second user is present.

In order to protect the privacy of the second user while also indicating to the first user that the second user is present, the remote device 102 may analyze the video data prior to downsampling to determine if a human is present and may send an indication whether a human is present along with the downsampled video data. For example, the remote device 102 may determine that a human is present using motion detection, object recognition, facial recognition, computer vision (CV) algorithms or the like. In some examples, the remote device 102 may capture high resolution video data in order to determine if a human is present while streaming the downsampled video data to the local device 102 in the standby mode. Additionally or alternatively, the remote device 102 may determine that a human is present based on sensor data, location data associated with a user or other positioning techniques identifying a human without using computer vision. For example, the user's mobile device (e.g., smartphone) or other electronic devices (e.g., smart watch, electronic reader, music device or the like) may be detected in proximity to the remote device, movement sensors (e.g., vibration sensors, motion detectors, etc.) may detect movement in proximity to the remote device, a microphone of the remote device may detect speech, breathing or the like, infrared sensor(s) may detect body heat, smell detector(s) may detect unique scents indicative of human activity, or the remote device may detect the user using other techniques (e.g., ultrasonic ranging, reflected infrared detection, etc.) known to one of skill in the art.

As illustrated in FIG. 8, the first standby mode image 812 includes a visual indication that a human is present and the second standby mode image 822 includes a visual indication that a human is not present. While the visual indications illustrated in FIG. 8 include text, the disclosure is not limited thereto and the visual indication may include icons, text, graphics or a combination thereof without departing from the disclosure.

FIGS. 9A-9B illustrate examples of visual effects used during standby mode according to embodiments of the present disclosure. As illustrated in FIG. 9A, the remote device 102 may indicate that a human is present using multiple techniques, including inserting a cartoon 912, a panning and zooming effect 922, a bounding box 932, a highlight effect 942 or other similar effects. For example, the remote device 102 may analyze an active mode image (e.g., first active mode image 810) to determine if a human is present. After determining that a human is present and determining a portion of the first active mode image 810 corresponding to the human, the remote device 102 may emphasize that a human is present and a location of the human by inserting the cartoon 912 in the portion of the first active mode image 810 to conceal the human, as illustrated in a first standby mode image 910. Additionally or alternatively, the remove device 102 may emphasize that the human is present and the location of the human by applying the panning and zooming effect 922 to pan and/or zoom in on the human, as illustrated in a second standby mode image 920. For example, the device 102 may select the portion of the first active mode image 810 that is associated with the human and may send only the portion of the first active mode image 810. Additionally or alternatively, the remote device 102 may emphasize that a human is present and a location of the human by generating the bounding box 932 around the human, as illustrated in a third standby mode image 930. Additionally or alternatively, the remote device 102 may emphasize that a human is present and a location of the human by generating the highlight effect 942 highlighting the human, as illustrated in fourth standby mode image 940. While FIG. 9A illustrates the highlight effect 942 including a silhouette, the present disclosure is not limited thereto and the device 102 may increase or decrease a contrast, luminance, brightness or the like associated with the human, change pixel values associated with the human to a specific color (e.g., highlight the human in bright red), or the like.

FIG. 9B illustrates another example of visual effects used during standby mode according to embodiments of the present disclosure. As illustrated in FIG. 9B, the remote device 102 may indicate that a human is present using multiple techniques, including replacing the human with a simplification 962, an abstract shape 972, a substitution 982 or the like. For example, the remote device 102 may analyze an active mode image (e.g., active mode image 950) to determine if a human is present. After determining that a human is present and determining a portion of the active mode image 950 corresponding to the human, the remote device 102 may emphasize that a human is present and a location of the human by displaying the simplification 962 that removes details of the human in the portion of the active mode image 950, as illustrated in a standby mode image 960. Additionally or alternatively, the remote device 102 may emphasize that the human is present and the location of the human by inserting the abstract shape 972 in place of the human, as illustrated in standby mode image 970. The abstract shape 972 may be any abstract shape, such as bubbles, flames, silhouette or other abstract shapes, without departing from the disclosure. Additionally or alternatively, the remote device 102 may emphasize that a human is present and a location of the human by inserting the substitution 982 in place of the human, as illustrated in standby mode image 980. The substitution 982 may be cartoon(s), icon(s), image(s) (e.g., stock image, personalized image for each unique user, etc.) or the like.

While FIGS. 9A-9B illustrate multiple examples of visual effects, the disclosure is not limited thereto. Instead, the device 102 may generate visual effects that stylize the presence of the human using vector line art, mapping remote users to cartoons (e.g., individual cartoons for each unique user, a single cartoon for any user, etc.), pixelization, color mapping and exaggeration, enhancing edges of moving forms or the like. In some examples, the device 102 may use a subtractive approach to detect a presence of the human (e.g., determining a portion of the active mode image corresponding to the human), such as by generating a baseline view (e.g., static image) of the environment and identifying changes to the environment over time.

In some examples, in addition to or alternative to identifying whether a human is present, the device 102 may emphasize that an object of interest is present and/or a location of the object of interest using the techniques illustrated in FIGS. 9A-9B. For example, the device 102 may identify pets (e.g., whether a cat or dog is within view of the device 102), cars (e.g., whether a car is parked outside a house or in a garage) or other objects of interest that a remote viewer may be interested in and may highlight the objects using special effects to increase visibility. Thus, while the device 102 sends obscured video data in the standby mode, the remote viewer may identify when an object of interest is visible to the device 102 and may initiate a videoconference based on the object of interest. For example, a user may remotely view their house while at work and may only desire to enter the active mode when a pet is visible to the device 102. Alternatively, a first user may see an object of interest visible in the obscured video data, such as a jacket, a car or other objects, which may indicate that a second user is nearby and available to videoconference.

In some examples, the device 102 determines the object of interest based on motion data. For example, the device 102 analyzes the video data to detect motion and generates a highlighting effect, a silhouette, a bounding box or other special effects (e.g., post-processed effects that modify the video data and/or overlays graphical data on top of the video data) to emphasize the motion. Additionally or alternatively, the device 102 may detect changes in the video data to determine user activity, such as a light turning on or other signs of activity.

Figure 10:
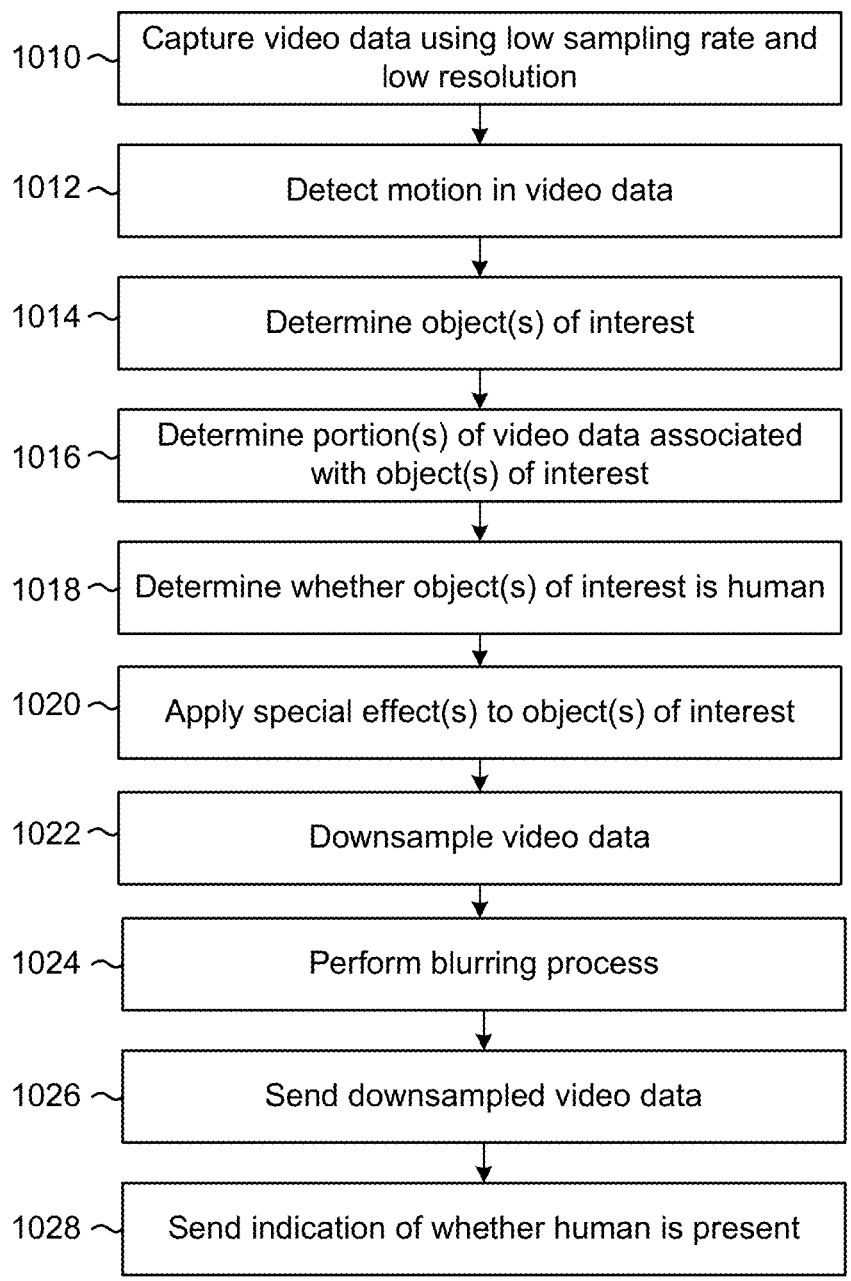
FIG. 10 is a flowchart conceptually illustrating an example method for applying special effects during standby mode according to embodiments of the present disclosure.

FIG. 10 is a flowchart conceptually illustrating an example method for applying special effects during standby mode according to embodiments of the present disclosure. As illustrated in FIG. 10, the device 102 may capture (1010) video data using a low sampling rate and a low resolution, detect (1012) motion in the video data, determine (1014) object(s) of interest, determine (1016) portion(s) of the video data associated with the object(s) of interest, optionally determine (1018) whether the object(s) of interest is human, apply (1020) special effects to the object(s) of interest, downsample (1022) the video data, optionally perform (1024) a blurring process on the downsampled video data, send (1026) the downsampled video data to a remote device and optionally send (1028) an indication of whether a human is present. As an example, the device 102 may detect motion and determine an object of interest corresponding to the motion, such as identifying a person or a pet represented in the video data that is in motion. Additionally or alternatively, the device 102 may not detect motion but may determine an object of interest, such as identifying a person or a pet represented in the video data that is stationary. The device 102 may apply special effects to the object(s) of interest, as discussed above with regard to FIGS. 9A-9B.

In step 1028, in addition to sending the indication of whether the human is present, in some examples the device 102 may send an indication of where the human is location (e.g., bounding box), and/or how the information should be presented to a user (e.g., replace the human with a picture of a cartoon or the like, as illustrated in FIG. 9A-9B). In some examples, the replacement occurs in step 1020 prior to generating and sending the downsampled video data. For example, the device 102 capturing the video data may replace portions of the video data with the replacement object (e.g., cartoon 912 or the like). However, the disclosure is not limited thereto and the device 102 may capture and send the downsampled video data without the replacement object, instead indicating the location and the replacement object to the remote device such that the remote device may replace the portions of the downsampled video data with the replacement object. For example, the remote device may perform the steps illustrated in FIG. 6B and perform an additional step of combining the smoothed video data with image data corresponding to the replacement object in order to display the replacement object instead of the human.

Figure 11A:
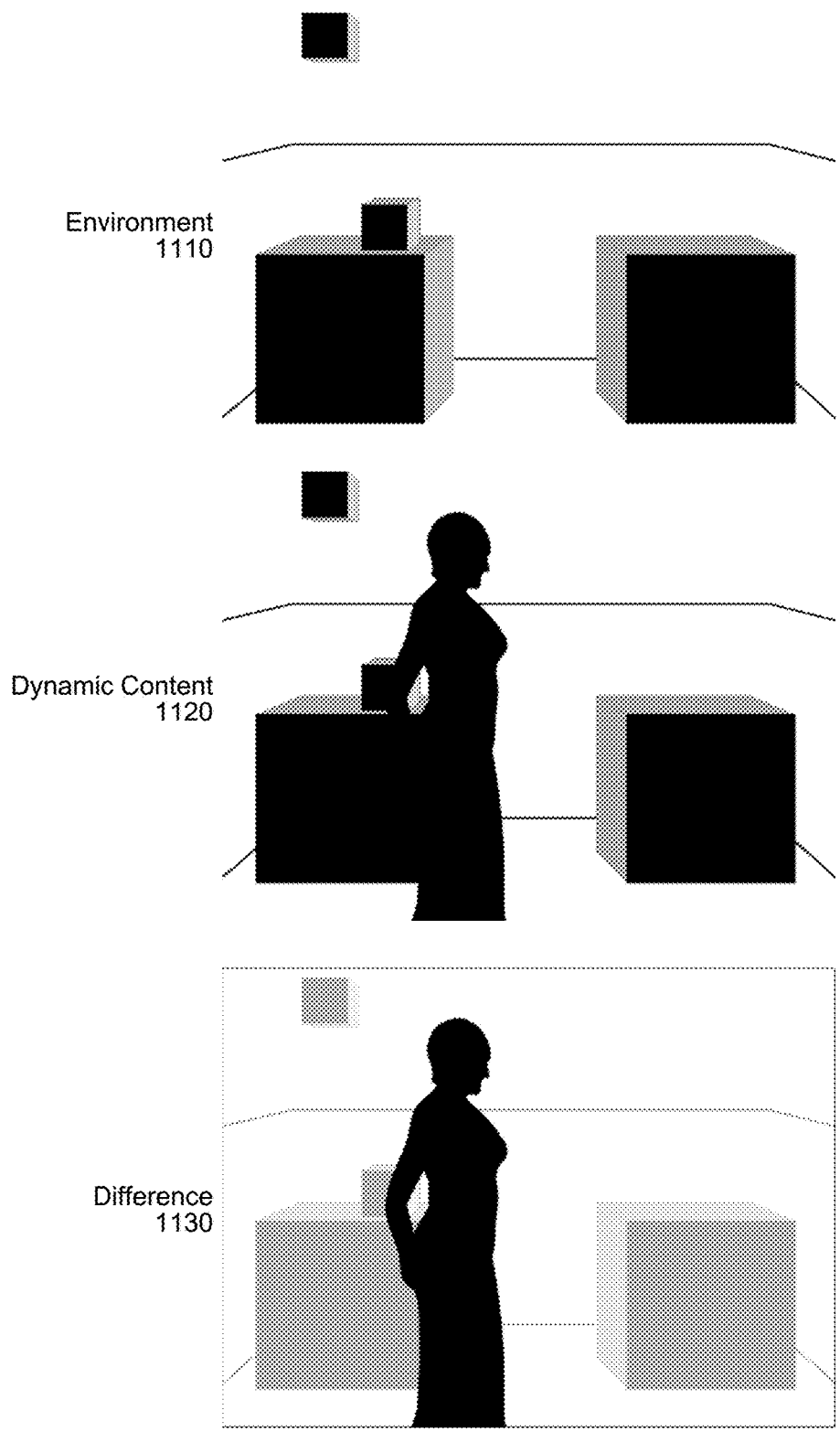

FIG. 11A illustrates an example of a subtractive approach that may be used to determine a portion of an active mode image corresponding to a human. As illustrated in FIG. 11A, the device 102 may capture an image of an environment 1110 when a human is not detected. For example, the device 102 may capture a high resolution image of the background. Using the environment 1110, the device 102 may capture dynamic content 1120 and compare the dynamic content 1120 to determine a difference 1130. Thus, the device 102 may detect the difference 1130 between the dynamic content 1120 and the environment 1110, the difference 1130 corresponding to the human, a pet, objects in motion or the like. The device 102 may determine the portion of the active mode image corresponding to the human (or object, pet or the like) based on the difference 1130. In some examples, the device 102 may generate a visual effect (as described above with regard to FIGS. 9A-9B) based on the difference 1130 and may send the visual effect along with high resolution image data (e.g., environment 1110) in a hybrid standby mode. While FIG. 11A illustrates an example of a subtractive approach, this example is provided for illustration purposes only and the disclosure is not limited thereto. Instead, the device 102 may use any technique(s) known to one of skill in the art to identify moving objects from frame to frame without departing from the disclosure.

FIG. 11B illustrates an example of a hybrid standby mode according to embodiments of the present disclosure. Instead of sending obscured (e.g., blurry) video data as in the standby mode, the device 102 sends a combination of high resolution image data and low resolution video data in the hybrid standby mode. For example, a first device 102a may generate low resolution video data 1120 while periodically capturing high resolution images, such as high resolution image 1150, and sending the high resolution images to a second device 102b. If the first device 102a doesn't detect activity, motion and/or objects of interest in the low resolution video data 1160, the first device 102a may not send the low resolution video data 1160 and the second device 102b may display the high resolution image 1150. Thus, a second user of the second device 102b may view a first environment of the first device 102a with reduced bandwidth consumption and may determine that there isn't activity, motion and/or objects of interest in the first environment. If the first device 102a detects activity, motion or objects of interest in the low resolution video data 1160, the first device 102a may identify a selected area 1162 corresponding to the activity, motion and/or objects of interest and may send the selected area 1162 to the second device 102b and the second device 102b may display the selected area 1162 superimposed on the high resolution image 1150. Thus, the second user may view the first environment with reduced bandwidth consumption and may determine that there is activity, motion and/or objects of interest without viewing details, protecting a privacy of a first user of the first device 102a.

FIG. 11B illustrates an example of the hybrid standby mode when the first user walks across the first environment. As illustrated in FIG. 11B, a first hybrid standby mode image 1170 includes a first portion of the low resolution video data 1160 (e.g., when the first user is standing in front of a window) superimposed on the high resolution image 1150, a second hybrid standby mode image 1172 includes a second portion of the low resolution video data 1160 (e.g., when the first user is standing between the window and a television) superimposed on the high resolution image 1150, and a third hybrid standby mode image 1172 includes a third portion of the low resolution video data 1160 (e.g., when the first user is standing in front of the television) superimposed on the high resolution image 1150. Thus, the second device 102b displays the first environment with additional detail and reduced bandwidth consumption, identifies activity, motion and/or objects of interest in the first environment while also protecting the privacy of the first user by reducing sharpness and/or details associated with the activity, motion and/or objects of interest.

In some examples, the user may initiate the hybrid standby mode when contacting a remote device. For example, if a first user is in a state of undress or otherwise doesn't want to be seen by a second user, the first user may switch to the hybrid standby mode with privacy engaged, instructing the device 102 to capture high resolution image(s) of the environment (e.g., background) while obscuring portions of the video data that correspond to the first user. Thus, the first user may send a communication request to the second user and/or accept a communication request from the second user while being obscured. Additionally or alternatively, the first user may instruct the device 102 to capture audio only and send the high resolution image(s) of the environment (e.g., background) with audio data to the second user.

Figure 12A:
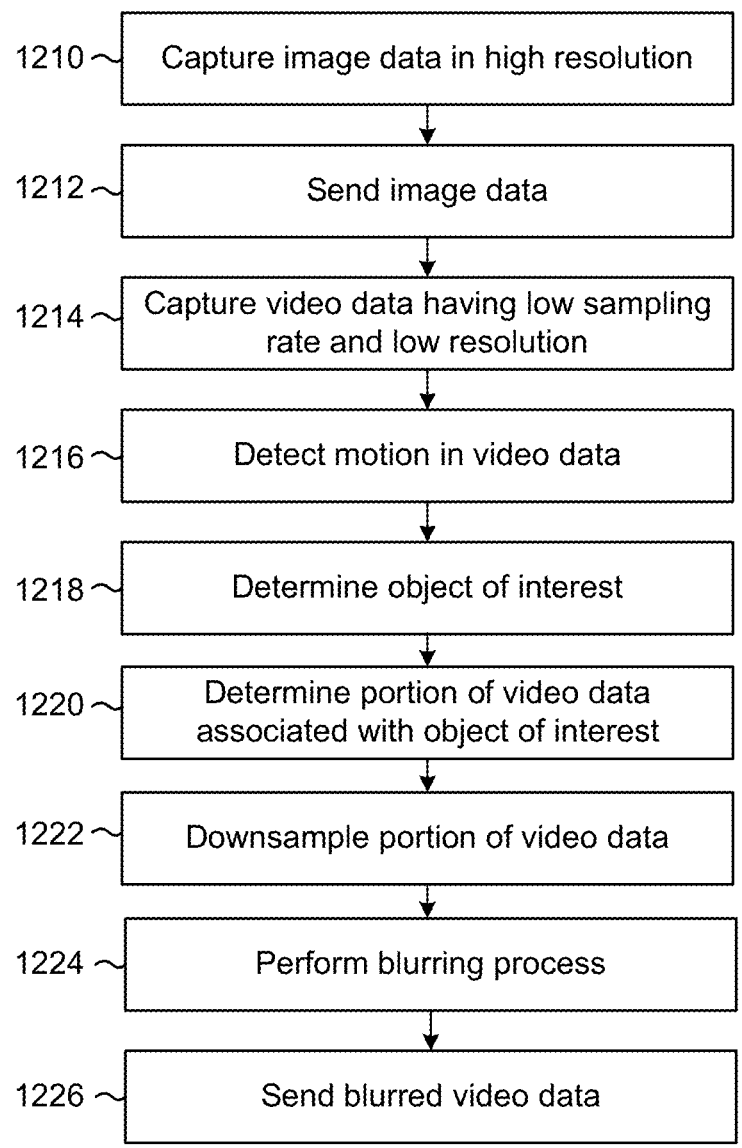
FIGS. 12A-12B are flowcharts conceptually illustrating example methods for videoconferencing using a hybrid standby mode according to embodiments of the present disclosure.
Figure 12B:
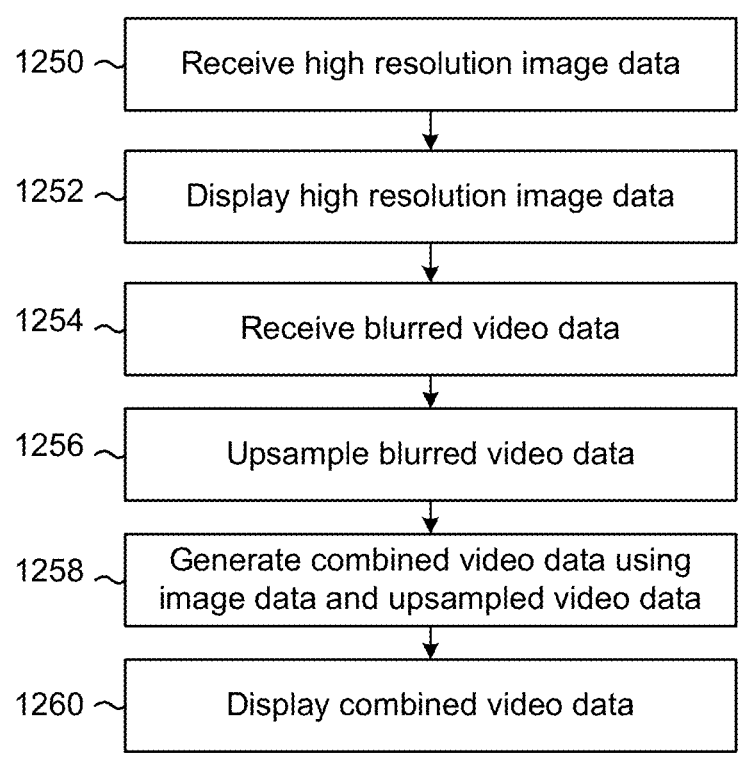

FIGS. 12A-12B are flowcharts conceptually illustrating example methods for videoconferencing using a hybrid standby mode according to embodiments of the present disclosure. As illustrated in FIG. 12A, the device 102 may capture (1210) image data in high resolution and send (1212) the image data to a remote device. The device 102 may then capture (1214) video data having a low sampling rate and low resolution, may detect (1216) motion in the video data, determine (1218) an object of interest, determine (1220) a portion of the video data associated with the object of interest, downsample (1222) a portion of the video data, optionally perform (1224) a blurring process (e.g., apply a Gaussian blur or the like) and send (1226) the blurred video data to the remote device.

As illustrated in FIG. 12B, the device 102 may receive (1250) a high resolution image data and display (1252) the high resolution image data. For example, when there is no activity, motion and/or objects of interest in the first environment, the remote device will display the high resolution image data. The device 102 may receive (1254) blurred video data, upsample (1256) the blurred video data, generate (1258) combined video data using the image data and the upsampled video data and display (1260) the combined video data. For example, when there is activity, motion and/or objects of interest in the first environment, the combined video data will include portions of the blurred video data corresponding to the activity, motion and/or objects of interest overlaid on the high resolution image data.

Figure 13:
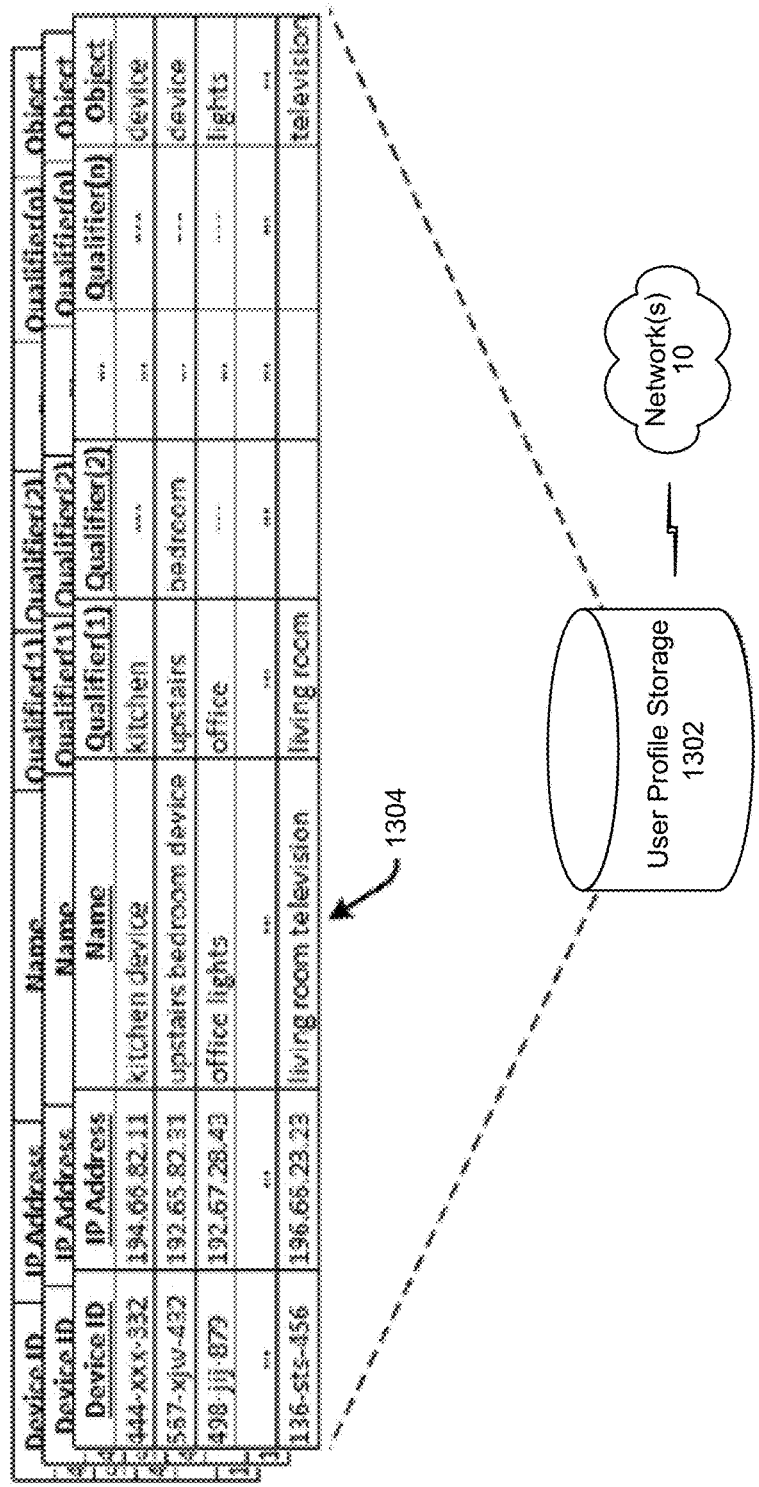
FIG. 13 illustrates data stored and associated with user profiles according to embodiments of the present disclosure.

The server(s) 112 may include or refer to data regarding user accounts, shown by the user profile storage 1302 illustrated in FIG. 13. The user profile storage 1302 may be located proximate to server(s) 112, or may otherwise be in communication with various components, for example over network(s) 10. The user profile storage 1302 may include a variety of information related to individual users, households, accounts, etc. that interact with the system 100. For illustration, as shown in FIG. 13, the user profile storage 1302 may include data regarding the devices associated with particular individual user accounts 1304. In an example, the user profile storage 1302 is a cloud-based storage. Such data may include device identifier (ID) and internet protocol (IP) address information for different devices as well as names by which the devices may be referred to by a user. Further qualifiers describing the devices may also be listed along with a description of the type of object of the device.

Further, the user account 1304 may include or be associated with different user preferences, such as an amount of blurring, a duration of time before entering the standby mode, devices 102 and/or users that can establish a videoconference without requiring an explicit authorization from the user, etc. For example, close friends and family may provide permission to each other to initiate a videoconference without requiring acknowledgement in order to facilitate communication. Thus, the user preferences may indicate that a device may enter the standby mode in response to a request to videoconference from a first user but not from a second user, or may indicate a first level of blur associated with the first user and a second level of blur associated with the second user to increase a level of privacy when sending video data to the second user. A device 102 may refer to the user account 1304 and corresponding data (e.g., user preferences) in order to configure settings for an individual user of the device 102.

Figure 14:
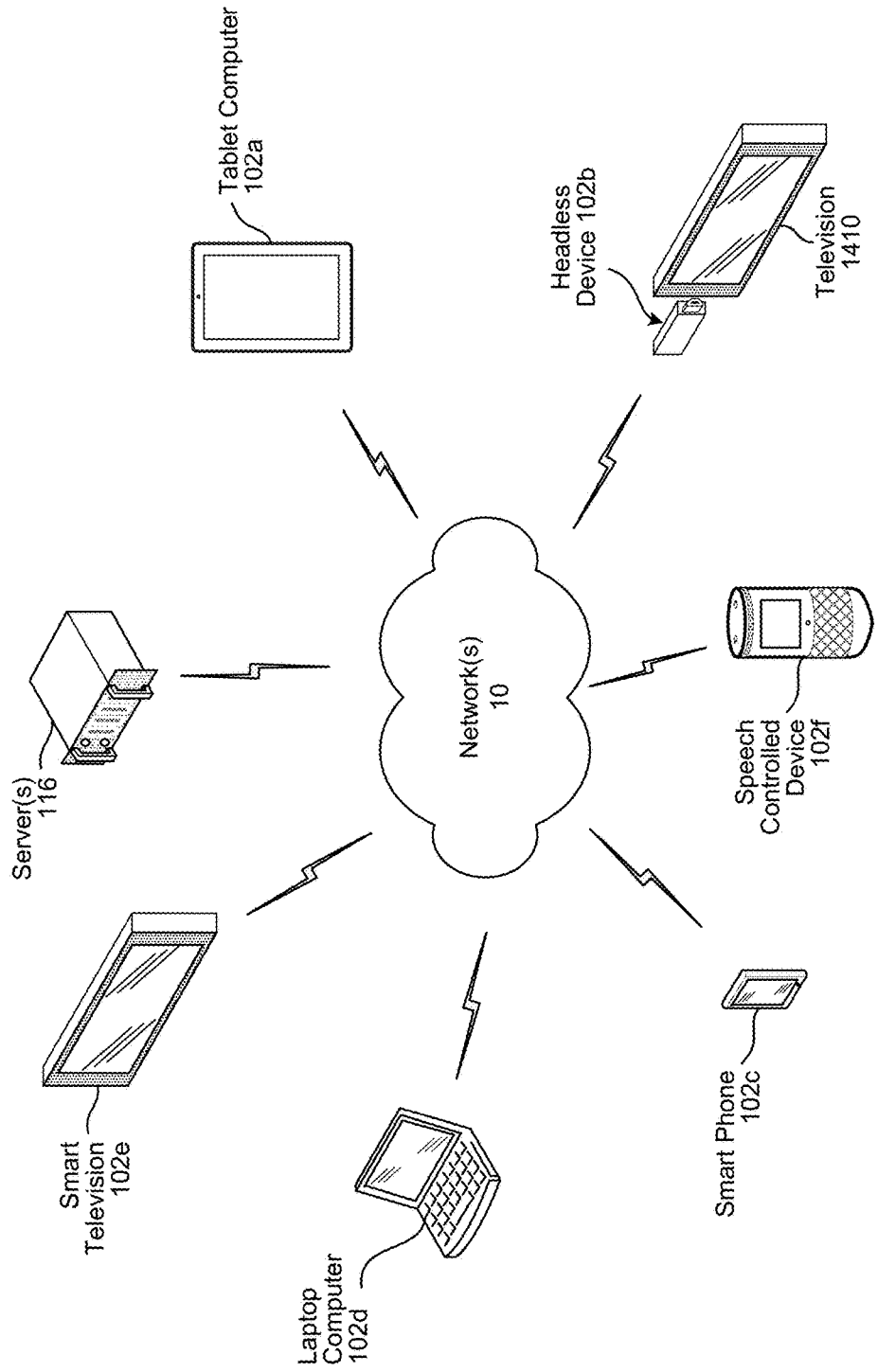
FIG. 14 illustrates an example of a computer network for use with the system.

As illustrated in FIG. 14 devices 102 may contain components of the system 100 and may be connected over network(s) 10. The network(s) 10 may be a local or private network or may be part of a wider network. Devices 102 may be connected to the network(s) 10 through either wired or wireless connections. For example, a tablet computer 102a, a headless device 102b, a smart phone 102c, a laptop computer 102d, a smart television 102e, and/or speech controlled device 102f, may be connected to the network(s) 10 through a wired and/or wireless connection.

Figure 15:
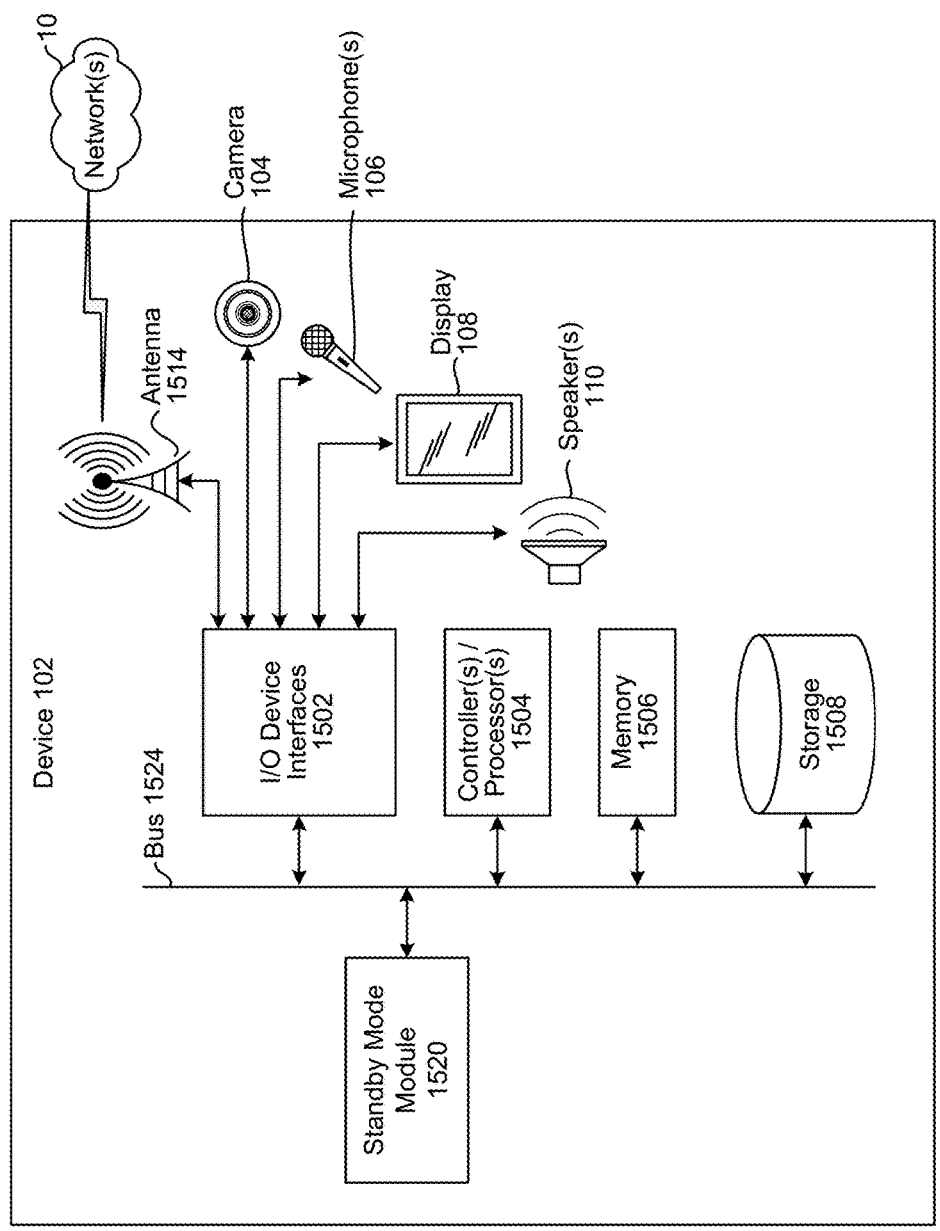
FIG. 15 is a block diagram conceptually illustrating example components of a device according to embodiments of the present disclosure.

FIG. 15 illustrates a block diagram conceptually illustrating example components of a device 102 according to the present embodiments. In operation, the device 102 may include computer-readable and computer-executable instructions that reside in storage 1508 on the device 102. The device 102 may be an electronic device capable of connecting to a wired or wireless network. Examples of electronic devices may include computers (e.g., a desktop, a laptop, a server or the like), portable devices (e.g., a camera, smart phone, tablet or the like), media devices (e.g., televisions, headless devices, video game consoles or the like) or the like. The device 102 may also be a component of any of the abovementioned devices or systems.

As illustrated in FIG. 15, the device 102 may include an address/data bus 1524 for conveying data among components of the device 102. Each component within the device 102 may also be directly connected to other components in addition to (or instead of) being connected to other components across the bus 1524.

The device 102 may include one or more controllers/processors 1504 comprising one-or-more central processing units (CPUs) for processing data and computer-readable instructions and a memory 1506 for storing data and instructions. The one or more controllers/processors 1504 may include CPU 430 and a graphics processing unit (GPU) 420. The memory 1506 may include volatile random access memory (RAM), non-volatile read only memory (ROM), non-volatile magnetoresistive (MRAM) and/or other types of memory. The device 102 may also include a data storage component 1508 for storing data and processor-executable instructions. The data storage component 1508 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 1502.

The device 102 includes input/output device interfaces 1502. The input/output device interfaces 1502 may be configured to operate with network(s) 10, for example a wireless local area network (WLAN) (such as WiFi), a local area network (LAN), Bluetooth, zigbee and/or wireless networks, such as a Long Term Evolution (LTE) network, WiMAX network, 3G network, etc. The network(s) 10 may include a local or private network or may include a wide network such as the internet. Devices may be connected to the network(s) 10 through a wired or wireless connection.

The input/output device interfaces 1502 may also include an interface for an external peripheral device connection such as universal serial bus (USB), FireWire, Thunderbolt, Ethernet port or other connection protocol that may connect to networks 10. The input/output device interfaces 1502 may be configured to operate with a camera 104, microphone(s) 106, a display 108 and/or speaker(s) 110, although the disclosure is not limited thereto.

The device 102 further includes a standby mode module 1520, which may comprise processor-executable instructions stored in storage 1508 to be executed by controller(s)/processor(s) 1504 (e.g., software, firmware), hardware, or some combination thereof. For example, components of the standby mode module 1520 may be part of a software application running in the foreground and/or background on the device 102. The standby mode module 1520 may control the device 102 as discussed above, for example with regard to FIGS. 1, 5A-5B, 6A-6B, 7A-7B, 10 and/or 12A-12B. Some or all of the controllers/modules of the standby mode module 1520 may be executable instructions that may be embedded in hardware or firmware in addition to, or instead of, software. In one embodiment, the device 102 may operate using an Android operating system (such as Android 4.3 Jelly Bean, Android 4.4 KitKat or the like), an Amazon operating system (such as FireOS or the like), or any other suitable operating system.

Executable computer instructions for operating the device 102 and its various components may be executed by the controller(s)/processor(s) 1504, using the memory 1506 as temporary "working" storage at runtime. The executable instructions may be stored in a non-transitory manner in non-volatile memory 1506, storage 1508, or an external device. Alternatively, some or all of the executable instructions may be embedded in hardware or firmware in addition to or instead of software.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
capturing, in a first mode, by a camera coupled to a first device, first image data at a first resolution and at a first sampling rate;
generating, by the first device, downsampled image data by downsampling the first image data, the downsampled image data having a second resolution that is lower than the first resolution;
sending, by the first device, the downsampled image data to a second device;
receiving, by the first device from the second device, an instruction to enter a second mode;
outputting, by the first device, a request for authorization to enter the second mode;
operating, by the first device, in the second mode based on a response to the request;
capturing, in the second mode, by the camera, second image data at a third resolution and at a second sampling rate, wherein at least one of the third resolution is higher than the first resolution or the second sampling rate is higher than the first sampling rate;
generating compressed image data from the second image data; and
sending the compressed image data to the second device.

2. The computer-implemented method of claim 1, further comprising, by the first device:
capturing, in the first mode, by the camera, third image data at the first resolution and the first sampling rate;
generating, by the first device, second downsampled image data by downsampling the third image data, the second downsampled image data having the second resolution;
receiving, by the first device from the second device, a second instruction to enter the second mode;
determining that the second instruction includes first security data matching second security data; and
capturing, in the second mode, by the camera, fourth image data at the third resolution and the second sampling rate.

3. The computer-implemented method of claim 1, further comprising, prior to sending the downsampled image data to the second device:
detecting motion in the first image data;
determining, using object recognition, that a human is present in the first image data; and
sending a human-present indication associated with the downsampled image data.

4. The computer-implemented method of claim 1, further comprising, prior to generating the downsampled image data:
detecting motion in the first image data;
detecting, using a computer vision algorithm, an object of interest corresponding to the motion;
determining a portion of the first image data corresponding to the object of interest; and
applying a visual effect to the portion of the first image data, the visual effect emphasizing the portion of the first image data.

5. The computer-implemented method of claim 1, further comprising, prior to receiving the instruction to enter the second mode:
capturing, by the camera, third image data, the third image data having the third resolution;
detecting motion in the first image data;
determining a portion of the first image data corresponding to the motion;
sending the third image data to the second device;
generating the downsampled image data by downsampling the portion of the first image data; and
sending the downsampled image data to the second device.

6. The computer-implemented method of claim 5, further comprising, by the second device:
receiving the third image data;
receiving the downsampled image data corresponding to the portion of the first image data;
generating combined image data, the combined image data comprising the third image data and the downsampled image data superimposed over a portion of the third image data; and displaying, based on the combined image data, a combined image on a display coupled to the second device.

7. The computer-implemented method of claim 1, further comprising, by the second device:
receiving, at a first time, the downsampled image data;
generating, using a second graphics processor on the second device, upsampled image data by upsampling the downsampled image data, the upsampled image data having a fourth resolution that is larger than the second resolution;
displaying, based on the upsampled image data, a first image on a display coupled to the second device;
receiving, at a second time after the first time, the compressed image data; and
displaying, based on the compressed image data, a second image on the display.

8. A device, comprising:
at least one processor;
a camera; and
a memory component including instructions operable to be executed by the at least one processor to configure the device to:
capture, in a first mode, by a camera coupled to the device, first image data at a first resolution and at a first sampling rate;
generate downsampled image data by downsampling the first image data, the downsampled image data having a second resolution that is lower than the first resolution;
send the downsampled image data to a second device;
receive, from the second device, an instruction to enter a second mode;
output a request for authorization to enter the second mode;
operate in the second mode based on a response to the request;
capture, in the second mode, by the camera, second image data at a third resolution and at a second sampling rate, wherein at least one of the third resolution is higher than the first resolution or the second sampling rate is higher than the first sampling rate;
generate compressed image data from the second image data; and
send the compressed image data to the second device.

9. A device, comprising:
at least one processor;
a camera; and
a memory component including instructions operable to be executed by the at least one processor to configure the device to:
capture, in a first mode, by the camera, first image data at a first resolution and at a first sampling rate;
detect motion in the first image data;
detect, using a computer vision algorithm, an object of interest corresponding to the motion;
determine a portion of the first image data corresponding to the object of interest;
apply a visual effect to the portion of the first image data, the visual effect emphasizing the portion of the first image data;
generate, using a first graphics processor on the device, downsampled image data by downsampling the first image data, the downsampled image data having a second resolution that is lower than the first resolution;
send the downsampled image data to a second device;
enter a second mode;
capture, in the second mode, by the camera, second image data at a third resolution and at a second sampling rate, wherein at least one of the third resolution is higher than the first resolution or the second sampling rate is higher than the first sampling rate;
generate compressed image data from the second image data; and
send the compressed image data to the second device.

10. The device of claim 9, wherein the instructions further configure the device to, prior to entering the second mode:
receive, from the second device, an instruction to enter the second mode;
output a request for authorization to enter the second mode;
receive, at the device, input authorizing the device to enter the second mode; and
determine to enter the second mode based on the input.

11. The device of claim 9, wherein the instructions further configure the device to, prior to entering the second mode:
receive, from the second device, an instruction to enter the second mode;
determine that the instruction includes first security data matching second security data; and
determine to enter the second mode.

12. The device of claim 9, wherein the instructions further configure the device to:
determine, using object recognition, that a human is present in the first image data; and
send a human-present indication associated with the downsampled image data.

13. The device of claim 9, wherein the instructions further configure the device to:
determine the portion of the first image data by determining first pixels within a perimeter of the object of interest in the first image data; and
apply the visual effect to the portion of the first image data by applying a silhouette effect to the first pixels, wherein the silhouette effect includes at least one of lowering a brightness of pixel values of the first pixels or changing the pixel values of the first pixels to a first color.

14. The device of claim 9, wherein the instructions further configure the device to:
determine the portion of the first image data by determining first pixels in the first image data that include the object of interest; and
apply the visual effect to the portion of the first image data by replacing at least some of the first pixels with third image data, wherein the third image data corresponds to an image.

15. The device of claim 9, wherein the instructions further configure the device to:
determine the portion of the first image data by determining first pixels in the first image data that include the object of interest; and
apply the visual effect to the portion of the first image data by replacing at least some of the first pixels with third image data, wherein the third image data corresponds to an abstract shape.

16. The device of claim 9, wherein the instructions further configure the device to:
determine the portion of the first image data by determining pixel coordinates of first pixels in the first image data that surround at least a portion of the object of interest; and apply the visual effect to the portion of the first image data by superimposing a geometric shape on the first image data based on the pixel coordinates.

17. The device of claim 9, wherein the instructions further configure the device to:
  determine the portion of the first image data by determining first pixels in the first image data that include the object of interest;
  determine second pixels in the first image data that correspond to static content; and
  apply the visual effect to the portion of the first image data by:
    applying a first effect to the first pixels, wherein the first effect includes at least one of lowering a brightness of first pixel values of the first pixels a first amount or changing the first pixel values to a first color; and
    applying a second effect to the second pixels, wherein the second effect includes at least one of lowering a brightness of second pixel values of the second pixels a second amount or changing the second pixel values to a second color.

18. The device of claim 9, wherein the instructions further configure the device to, prior to entering the second mode:
  capture, by the camera, third image data, the third image data having the third resolution;
  send the third image data to the second device;
  determine a second portion of the first image data corresponding to the motion;
  generate the downsampled image data by downsampling the second portion of the first image data; and
  send the downsampled image data to the second device.

19. A system, comprising the device of claim 18, and further comprising:
  the second device, the second device comprising:
    at least one second processor;
    a second memory component including instructions operable to be executed by the at least one second processor to configure the second device to:
      receive the third image data;
      receive the downsampled image data;
      generate combined image data, the combined image data comprising the third image data and the downsampled image data superimposed over a portion of the third image data; and
      display the combined image data on a display coupled to the second device.

20. A system, comprising the device of claim 9, and further comprising:
  the second device, the second device comprising:
    at least one second processor;
    a second memory component including instructions operable to be executed by the at least one second processor to configure the second device to:
      receive, at a first time, the downsampled image data;
      generate, using a second graphics processor on the second device, upsampled image data by upsampling the downsampled image data, the upsampled image data having a fourth resolution that is larger than the second resolution;
      display, based on the upsampled image data, a first image on a display coupled to the second device;
      receive, at a second time after the first time, the compressed image data; and
      display, based on the compressed image data, a second image on the display.

* * * * *